(12) United States Patent
Aihara et al.

(10) Patent No.: US 8,131,886 B2
(45) Date of Patent: *Mar. 6, 2012

(54) IMAGE FORMING APPARATUS, IMAGE PROCESSING DEVICE, CONTROL DEVICE, AND CONNECTION DEVICE

(75) Inventors: Takashi Aihara, Saitama (JP);
Hidemasa Morimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/910,327

(22) Filed: Oct. 22, 2010

(65) Prior Publication Data

US 2011/0040919 A1    Feb. 17, 2011

Related U.S. Application Data

(63) Continuation of application No. 12/045,214, filed on Mar. 10, 2008, now Pat. No. 7,844,755.

(30) Foreign Application Priority Data

Mar. 16, 2007    (JP) ................................. 2007-069646

(51) Int. Cl.
*G06F 3/00* (2006.01)
*G06F 13/12* (2006.01)
(52) U.S. Cl. .................. 710/8; 710/32; 710/36; 710/62

(58) Field of Classification Search ........................ None
See application file for complete search history.

(56) References Cited

U.S. PATENT DOCUMENTS

| | | | |
|---|---|---|---|
| 5,369,751 A * | 11/1994 | Kambayashi et al. | 710/74 |
| 7,219,166 B2 * | 5/2007 | Inoue | 710/2 |
| 2003/0212841 A1 * | 11/2003 | Lin | 710/62 |
| 2007/0139743 A1 | 6/2007 | Namizuka | |
| 2009/0116062 A1 | 5/2009 | Aihara et al. | |

FOREIGN PATENT DOCUMENTS

| | | |
|---|---|---|
| JP | 2004-106456 | 4/2004 |
| JP | 2005-148896 | 6/2005 |

* cited by examiner

*Primary Examiner* — Alan Chen
(74) *Attorney, Agent, or Firm* — Oblon, Spivak, McClelland, Maier & Neustadt, L.L.P.

(57) ABSTRACT

A disclosed image forming apparatus includes an image processing device including plural image processing units; a control device configured to control the plural image processing units; and a connection unit configured to connect the image processing device to the control device. Each of the plural image processing units is connected to the control device by one of plural channels; the image processing device is connected to the control device by a first bus including the channels; and the connection unit is provided on the first bus so that the image processing device is connected to the control device by a single connection unit.

14 Claims, 18 Drawing Sheets

IMAGE FORMING APPARATUS, IMAGE PROCESSING DEVICE, CONTROL DEVICE, AND CONNECTION DEVICE

CROSS-REFERENCE TO RELATED APPLICATIONS

This application is a continuation of and claims the benefit under 35 U.S.C. §120 from U.S. application Ser. No. 12/045,214, filed on Mar. 10, 2008 now U.S. Pat. No. 7,844,755, which claims priority under 35 U.S.C. §119 from Japanese Patent Application No. 2007-069646, filed Mar. 16, 2007, the entire contents of each of which are hereby incorporated by reference.

BACKGROUND OF THE INVENTION

1. Field of the Invention

The present invention relates to an image forming apparatus, an image processing device, a control device, and a connection device.

2. Description of the Related Art

Conventionally, there is a technology of providing a high-speed serial bus as an internal bus in an image processing device for transferring data inside the image processing apparatus at high speed. Generally, image data are high-volume, and therefore the technology of transferring such data at high speed is important for performing high-speed processing.

For example, Japanese Laid-Open Patent Application No. 2005-148896 (Patent Document 1) discloses an invention of further increasing the processing speed of an image equipment system that uses a PCI-Express® interface (I/F) (hereinafter, "P-E") which is a high-speed serial I/F. Specifically, plural switches are provided under a route complex. The functions connected to the switches are appropriately divided in order to separate the data transfer operation performed via the route complex and the data transfer operation performed with a switch as the highest level.

Furthermore, for example, Japanese Laid-Open Patent Application No. 2004-106456 (Patent Document 2) discloses an invention of an image forming apparatus in which a controller and an image forming function unit in the image forming apparatus are connected by a P-E bus. Accordingly, the controller and the image forming function unit are removably attached to each other, and moreover, the overall power consumption of the apparatus can be controlled.

According to the image forming apparatus disclosed in Patent Document 2, the controller and the image forming function unit can be performed on separate substrates. This configuration facilitates increasing speed, improving performance, and increasing the number of functions, which require changes in the design of a circuit board.

The "controller" and the "image forming function unit" described in Patent Document 2 correspond to the "control device" and the "image processing device" of the present invention, respectively.

Patent Document 1: Japanese Laid-Open Patent Application No. 2005-148896

Patent Document 2: Japanese Laid-Open Patent Application No. 2004-106456

However, the invention of the image forming apparatus disclosed in Patent Document 2 does not describe how the substrate having a controller function and the substrate performing the image forming function are connected to each other. The type of image processing performed by an image forming apparatus differs according to the type of image and the purpose, such as an image read with a scanner or an image to be output with a plotter. A large scale integrated circuit (LSI) or a substrate may be provided for each type of image processing. With such a configuration where each of the different substrates is connected to the substrate having the controller function with a connection unit such as a connector, it is necessary to develop each individual substrate as well as a dedicated connector for each substrate, which leads to increased development costs.

SUMMARY OF THE INVENTION

The present invention provides an image forming apparatus, an image processing device, a control device, and a connection device in which one or more of the above-described disadvantages are eliminated.

A preferred embodiment of the present invention provides an image forming apparatus in which a control device and an image processing device in the image forming apparatus are connected by a single connection unit, the image processing device and the control device thereof, and a connection device for connecting the image processing device and the control device.

An embodiment of the present invention provides an image forming apparatus including an image processing device including plural image processing units; a control device configured to control the plural image processing units; and a connection unit configured to connect the image processing device to the control device, wherein each of the plural image processing units is connected to the control device by one of plural channels; the image processing device is connected to the control device by a first bus including the channels; and the connection unit is provided on the first bus so that the image processing device is connected to the control device by a single connection unit.

An embodiment of the present invention provides an image processing device in an image forming apparatus, wherein the image processing device is connected to a control device located in the image forming apparatus by a single connection unit; the image processing device includes plural image processing units; each of the plural image processing units is connected to the control device by one of plural channels; the image processing device is connected to the control device by a first bus including the channels; the connection unit is provided on the first bus so that the image processing device is connected to the control device by a single connection unit; and the image processing units are arranged in such a manner as to correspond to an arrangement of terminal blocks included in the connection unit, wherein each of the terminal blocks corresponds to one of the image processing units, and each of the terminal blocks includes terminals corresponding to signals that are input to or output from the corresponding one of the image processing units.

An embodiment of the present invention provides a control device provided in an image forming apparatus, wherein the control device is connected to an image processing device provided in the image forming apparatus by a single connection unit; the control device includes plural control units; each of the plural control units is connected to the image processing device by one of plural channels; the control device is connected to the image processing device by a first bus including the channels; the connection unit is provided on the first bus so that the control device is connected to the image processing device by a single connection unit; and the control units are arranged in such a manner as to correspond to an arrangement of terminal blocks included in the connection unit, wherein each of the terminal blocks corresponds to one of the control units, and each of the terminal blocks includes terminals corresponding to signals that are input to or output from the corresponding one of the control units.

An embodiment of the present invention provides a connection device for connecting a first device including plural first units to a second device including plural second units, wherein each of the plural first units is connected to one of the plural second units by a single channel; the first device is connected to the second device by a first bus including plural of the channels; and a connection unit is provided on the first bus so that the first device is connected to the second device by a single connection unit.

According to one embodiment of the present invention, an image forming apparatus in which a control device and an image processing device in the image forming apparatus are connected by a single connection unit, the image processing device and the control device thereof, and a connection device for connecting the image processing device and the control device are provided.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of an embodiment of the present invention.

To facilitate understanding of an embodiment of the present invention, before describing an embodiment of the present invention, a description is given of a conventional example in which plural substrates are connected with the use of a P-E bus. In the following, a "board" corresponds to a "substrate".

Figure 1:
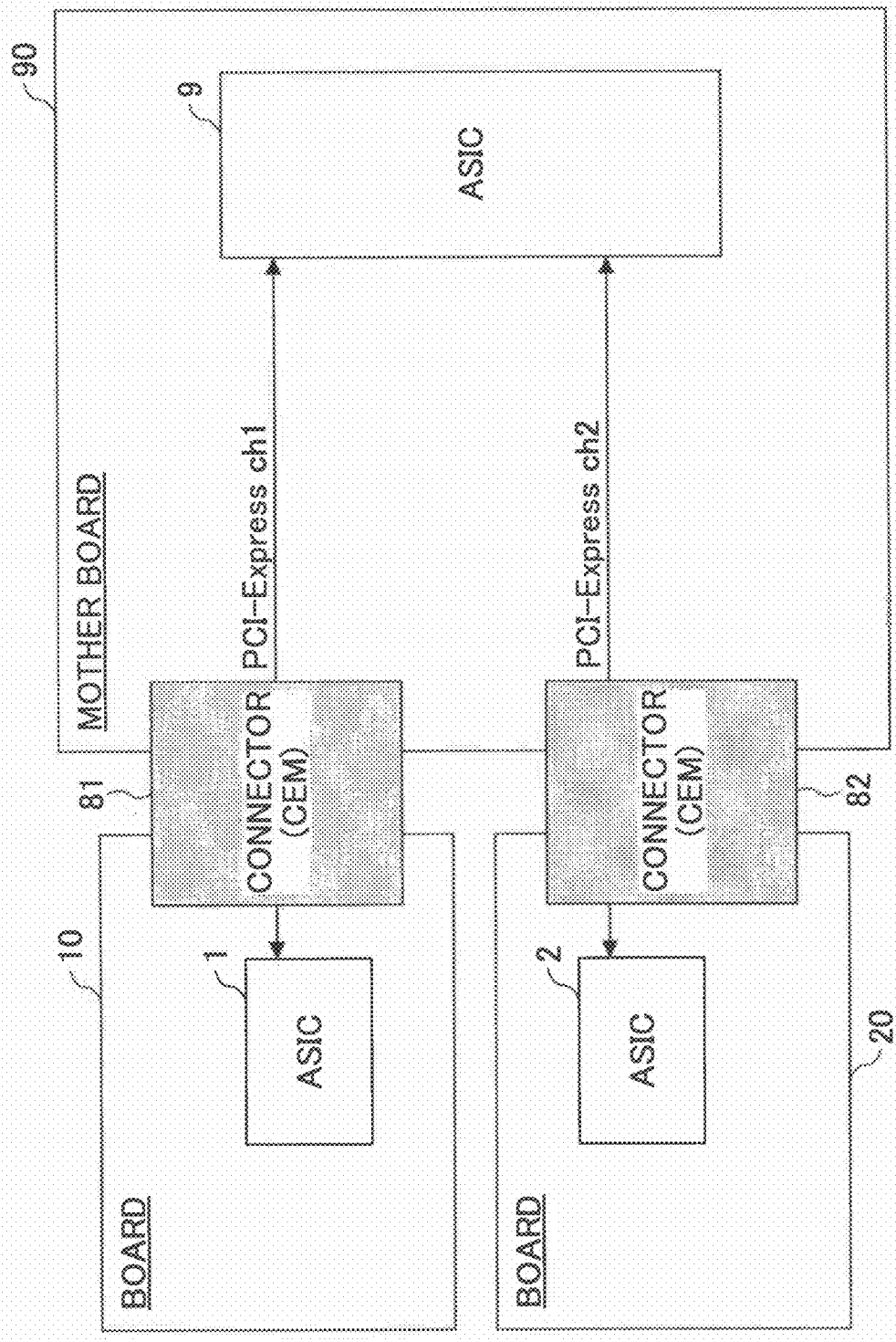
FIG. 1 illustrates a conventional configuration in which a motherboard, a circuit board (board), and another board are connected with the use of a P-E bus.

FIG. 1 illustrates a configuration in which a motherboard 90, a board 10, and a board 20 are connected with the use of a P-E bus. The board 10 is connected to the motherboard 90 by a connector 81, and the board 20 is connected to the motherboard 90 by a connector 82.

The board 10 includes an ASIC (application-specific integrated circuit) 1, the board 20 includes an ASIC 2, and the motherboard 90 includes an ASIC 9. The ASIC 1 is connected to the ASIC 9 by a channel 1 of the P-E bus, and the ASIC 2 is connected to the ASIC 9 by a channel 2 of the P-E bus.

Figure 2:
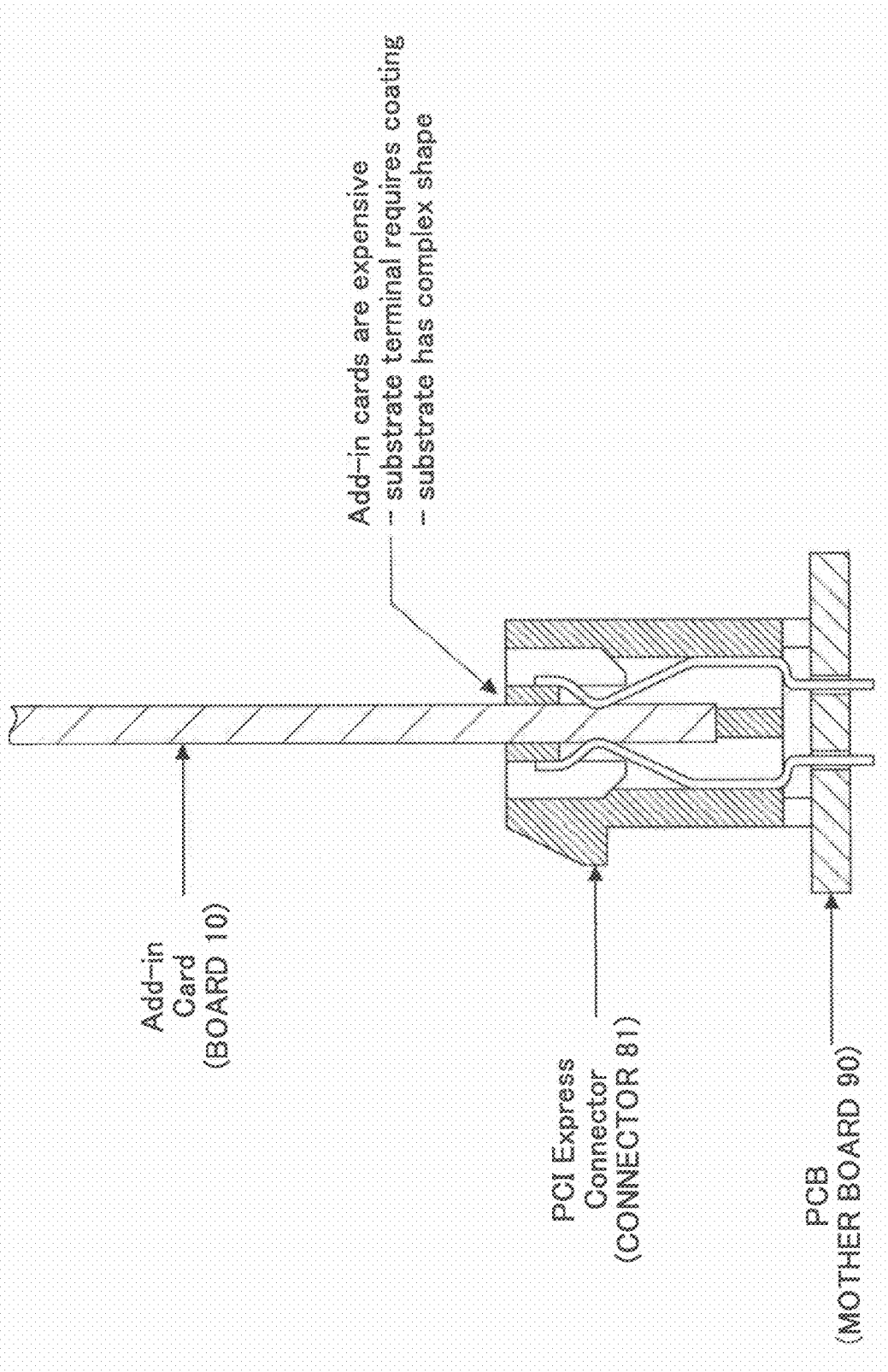
FIG. 2 is a cross-sectional view of the part where the board and the motherboard are connected by the connector.

FIG. 2 is a cross-sectional view of the part where the board 10 and the motherboard 90 are connected by the connector 81. In FIG. 2, the motherboard 90 that is a printed circuit board and the board 10 that is an expansion board is connected by the connector 81. The connector 81 has a specification defined by the "Card Electromechanical Specification" (hereinafter, "CEM specification"), which is a standard of the P-E regarding a system card and an add-in card.

The physical layer of the P-E bus has a data transfer capability of 2.5 Gbps one way, and connects the devices in a one-to-one manner. A pair of differential signals transferred bidirectionally is referred to as a "lane", and the number of lanes can be increased according to need. Thus, the bus width corresponding to the bandwidth of the bus is expandable.

In the present specification, a bundle of lanes used for connecting devices in a one-to-one manner is referred to as a "channel". Accordingly, the P-E bus includes one or more channels. Each channel can include clock signals, etc., for controlling the devices.

Embodiments of the present invention are described with reference to the figures.

Figure 3:
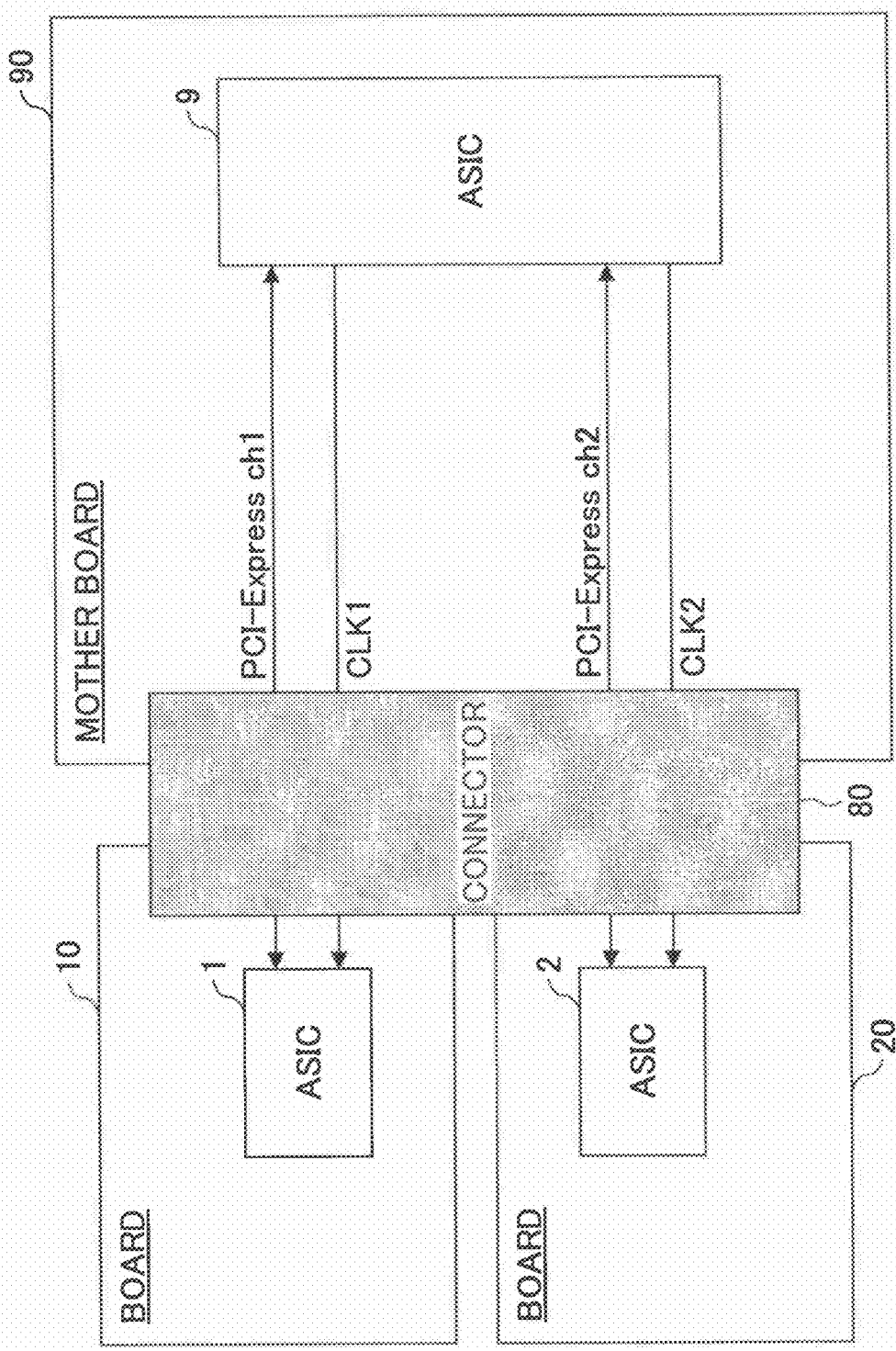
FIG. 3 illustrates plural boards connected to a single board by a single connection device.

FIG. 3 illustrates a connection device according to an embodiment of the present invention and boards connected by the connection device, where plural boards are connected to a single board by a single connection device. A single connector 80 shown in FIG. 3 connects the board 10 and the board 20 to the motherboard 90. The connector 80 is provided on the P-E bus. This bus includes a channel 1 for connecting ASIC 1 and ASIC 9, and a channel 2 for connecting ASIC 2 and ASIC 9.

In FIG. 3, in addition to channel 1 and channel 2, clock signals CLK1 and CLK2 are output from the ASIC 9 to the ASIC 1 and to the ASIC 2, respectively. CLK1 and CLK2 are predetermined clock signals, which can be included in the channels.

(Examples of Terminal Arrangement in Connector 80)

Figure 4:
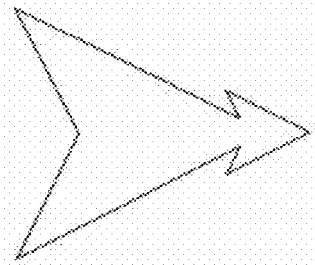
FIG. 4 is an example of an arrangement of terminals of a connector (part 1)
Figure 5:
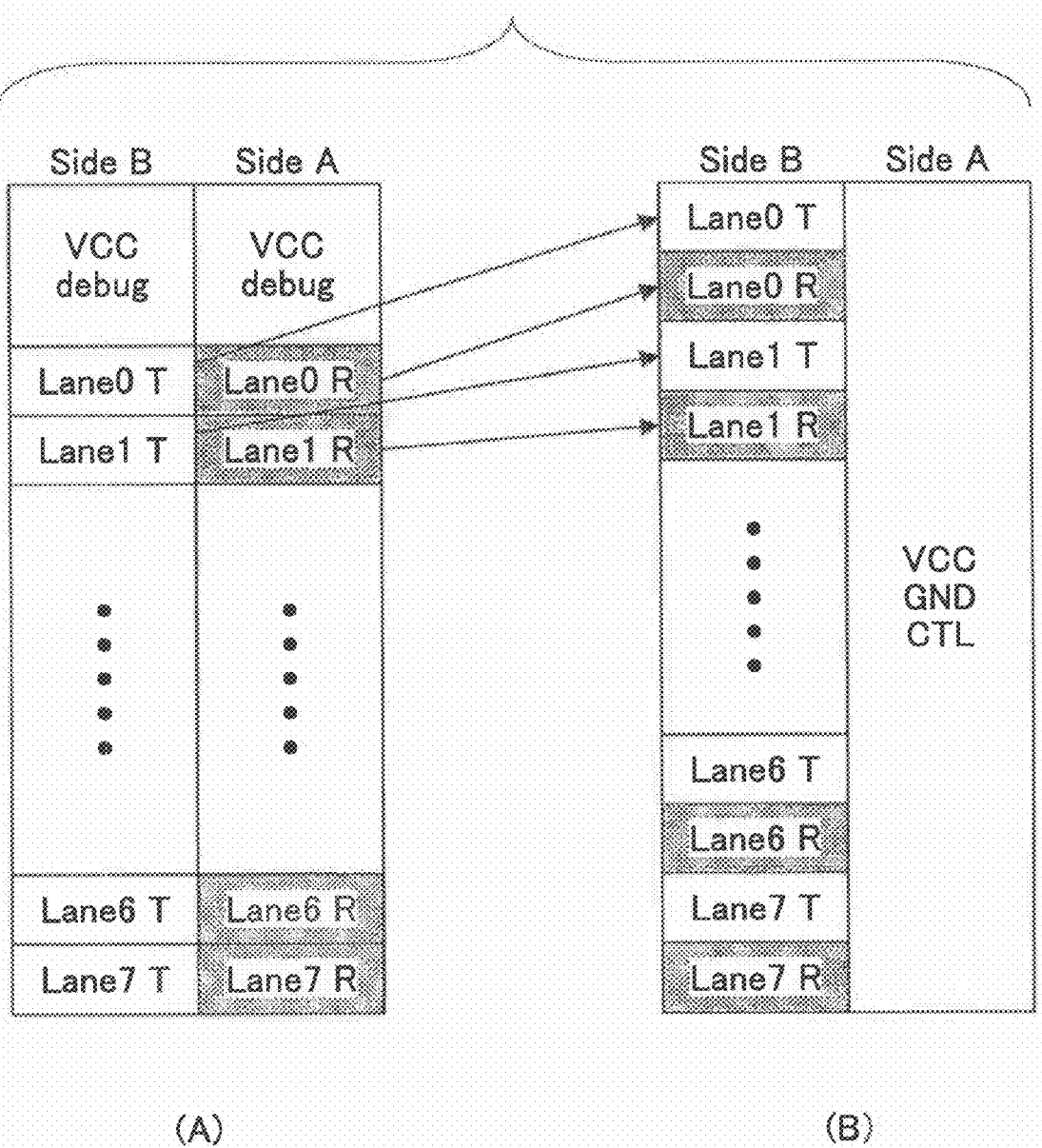
FIG. 5 is an example of an arrangement of terminals of a connector (part 2)

FIGS. 4 and 5 illustrate examples of arrangements of terminals in the connector 80. In FIG. 4, the connector 81 is, for example, for connecting the board 10 shown in FIG. 1 and the motherboard 90, and the connector 82 is, for example, for connecting the board 20 shown in FIG. 1 and the motherboard 90.

The connector 81 includes VCC which is a terminal for the power source, debug which is a terminal for control signals, CLK0 which is a terminal for clock signals, and four terminals of Lane00 through Lane03 each corresponding to one of the lanes. The connector 82 includes VCC which is a terminal for the power source, debug which is a terminal for control signals, CLK1 which is a terminal for clock signals, and four terminals of Lane10 through Lane13 each corresponding to one of the lanes.

The connector 80 includes terminals corresponding to the terminals of the connector 81 and the connector 82. As terminals for channel control signals, the connector 80 includes VCC which is a terminal for the power source, CTL which is a terminal for control signals, and GND which is a terminal for connecting to an electrical ground.

The connector 80 further includes CLK0 and the four terminals of Lane00 through Lane03 which are terminals corresponding to channel 1 for connecting the motherboard 90 and the board 10. The connector 80 further includes CLK1 and the four terminals of Lane10 through Lane13 which are terminals corresponding to channel 2 for connecting the motherboard 90 and the board 20.

FIG. 5 illustrates the arrangement of terminals in the connection device according to an embodiment of the present invention. In FIG. 5, in each of the connection devices illustrated in (A) and (B), the terminals are arranged in two rows. The respective rows are referred to as side A and side B.

FIG. 5(A) illustrates an arrangement of terminals in a case where two channels are connected with a single connector, which is defined by the CEM specification. In FIG. 5(A), VCC and debug which are terminals for channel control signals are included in both side A and side B. In side A, terminals Lane0 R through Lane7 R corresponding to lane 0 through lane 7 are arranged in the order of lanes. In side B, terminals Lane0 T through Lane7 T corresponding to lane 0 through lane 7 are arranged in the order of lanes.

The letter "T" in Lane0 T, etc., represents terminals corresponding to signals output from the motherboard 90 to the board 10. The letter "R" in Lane0 R, etc., represents terminals corresponding to signals input from the board 10 to the mother board 90.

FIG. 5(B) illustrates an arrangement of terminals in the connection device according to an embodiment of the present invention. In the connection device of FIG. 5(B), a control signal terminal block is provided in side A, and a transfer signal terminal block is provided in side B. More specifically, as terminals for channel control signals, side A is provided with VCC which is a terminal for the power source, GND which is a terminal for connecting to the electrical ground, and CTL which is a terminal for control signals. Side B is provided with terminals of Lane0 T through Lane7 R, which are arranged by each lane in the order of Lane0 T, Lane0 R, Lane1 T, Lane1 R . . . and so forth. That is, there are pairs of signals, each pair including input signals and output signals for one lane. These pairs of signals are arranged in the order of the lanes.

(Diagram Illustrating a Controller and an Engine Unit Connected by a Connection Device in an Image Forming Apparatus)

Figure 6:
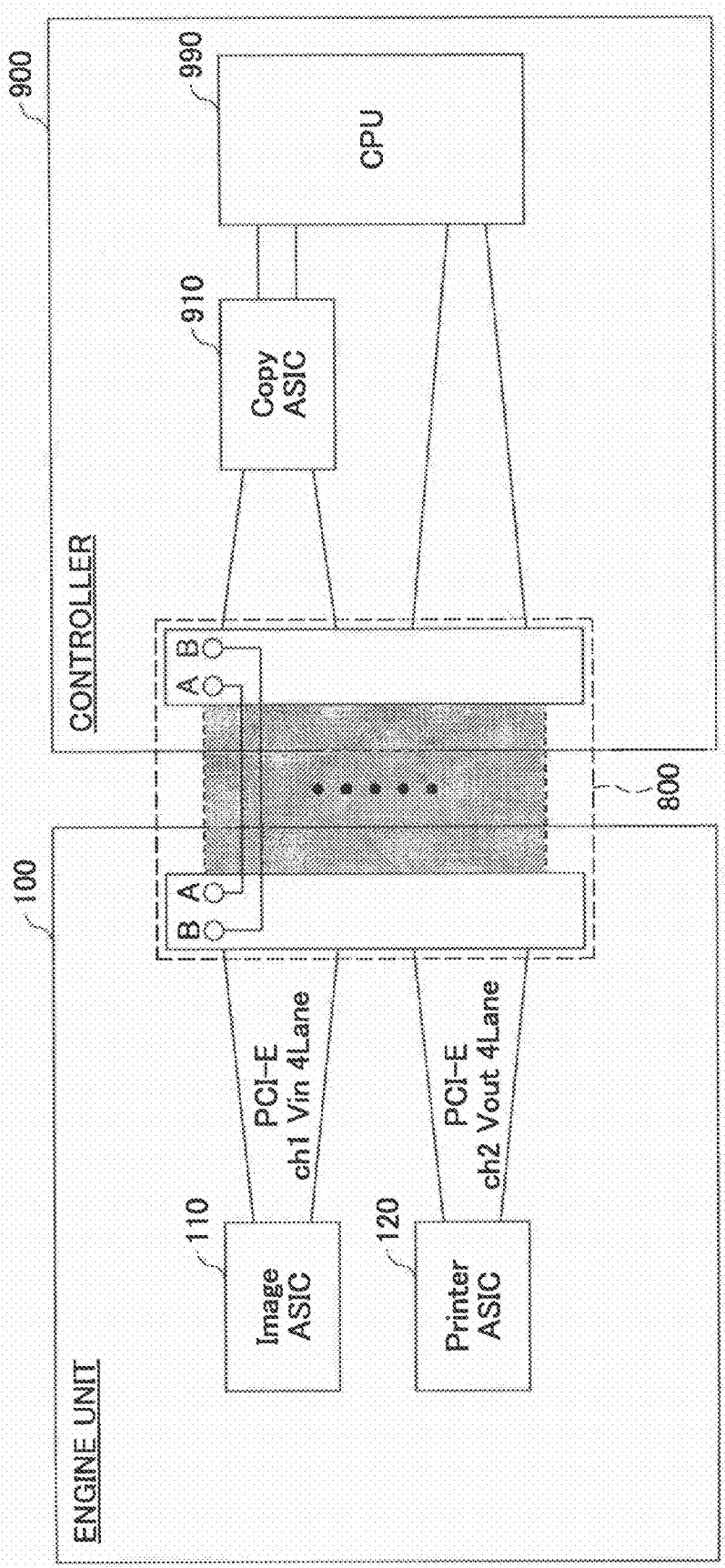
FIG. 6 illustrates a controller, an engine unit, and a connector included in an image forming apparatus according to an embodiment of the present invention.

FIG. 6 illustrates a controller and an engine unit that are connected by the connection device of FIG. 5(B) in an image forming apparatus. The image forming apparatus illustrated in FIG. 6 includes a controller 900, an engine unit 100, and a connector 800.

The controller 900 controls the engine unit 100 and other devices included in the image forming apparatus. The controller 900 includes, for example, a Copy ASIC 910 and a CPU 990. The Copy ASIC 910 is a unit for performing processes such as correcting an image when the image forming apparatus performs a copying process.

The CPU 990 is a unit for performing various control operations by the controller 900 by executing a predetermined computer program. The computer program executed by the CPU 990 can be stored in a storage device (not shown).

The engine unit 100 includes units pertaining to image processes performed by the image forming apparatus. The engine unit 100 includes, for example, an Image ASIC 110 and a Printer ASIC 120. The Image ASIC 110 is a unit for performing, for example, a predetermined process on signals output from a scanner (not shown), and generating or restructuring image data to be processed in the image forming apparatus. The Printer ASIC 120 is a unit for processing image data for output to a plotter included in the image forming apparatus.

Each of the Image ASIC 110 and the Printer ASIC 120 is connected to the controller 900 by a P-E channel including four lanes. Signals output from the Image ASIC 110 and the Printer ASIC 120 are connected to terminals of the connector 800 by wiring of the engine unit 100.

Wiring for connecting the Image ASIC 110 to a terminal of the connector 800 and wiring for connecting the Printer ASIC 120 to a terminal of the connector 800 are arranged on the engine unit 100 in such a manner as to not intersect each other.

For example, the connector 800 has a configuration as shown in (B) of FIG. 5, in which terminal blocks are arranged in two rows, each row including terminals on the engine unit 100 and on the controller 900. The respective rows are referred to as side A and side B. Each terminal in the terminal block of side A provided on the engine unit 100 is connected to one of the terminals in the terminal block of side A provided on the controller 900. Each terminal in the terminal block of side B provided on the engine unit 100 is connected to one of the terminals in the terminal block of side B provided on the controller 900.

The terminal block provided on the engine unit 100 further includes a terminal block corresponding to the Image ASIC 110 and terminal block corresponding to the Printer ASIC 120. The terminal blocks are provided in the connector 800 in such a manner as to be independent from each other.

In the above configuration, the Image ASIC 110 and the Printer ASIC 120 are physically connected to the controller 900 by a single connector 800.

The Image ASIC 110, the Printer ASIC 120, the Copy ASIC 910, and the CPU 990 are logically connected by a single bus. This bus can be, for example, a P-E bus. In this case, the channel connecting the Image ASIC 110 and the Copy ASIC 910 is a channel for image input, which channel includes four lanes of the P-E. The channel connecting the Printer ASIC 120 and the CPU 990 is a channel for image output, which channel includes four lanes of the P-E.

In the above configuration, the connector 800 is provided on a bus connecting the engine unit 100 and the controller 900, thereby forming a connection between this bus and channels included in the bus.

(Example of a Detailed Configuration of an Image Forming Apparatus According to an Embodiment of the Present Invention)

FIGS. 7 through 19 illustrate examples of configurations of an image forming apparatus according to embodiments of the present invention.

(Example of an Image Forming Apparatus Including a Common Printed Circuit Board and a Common Connector—Part 1—)

Figure 7:
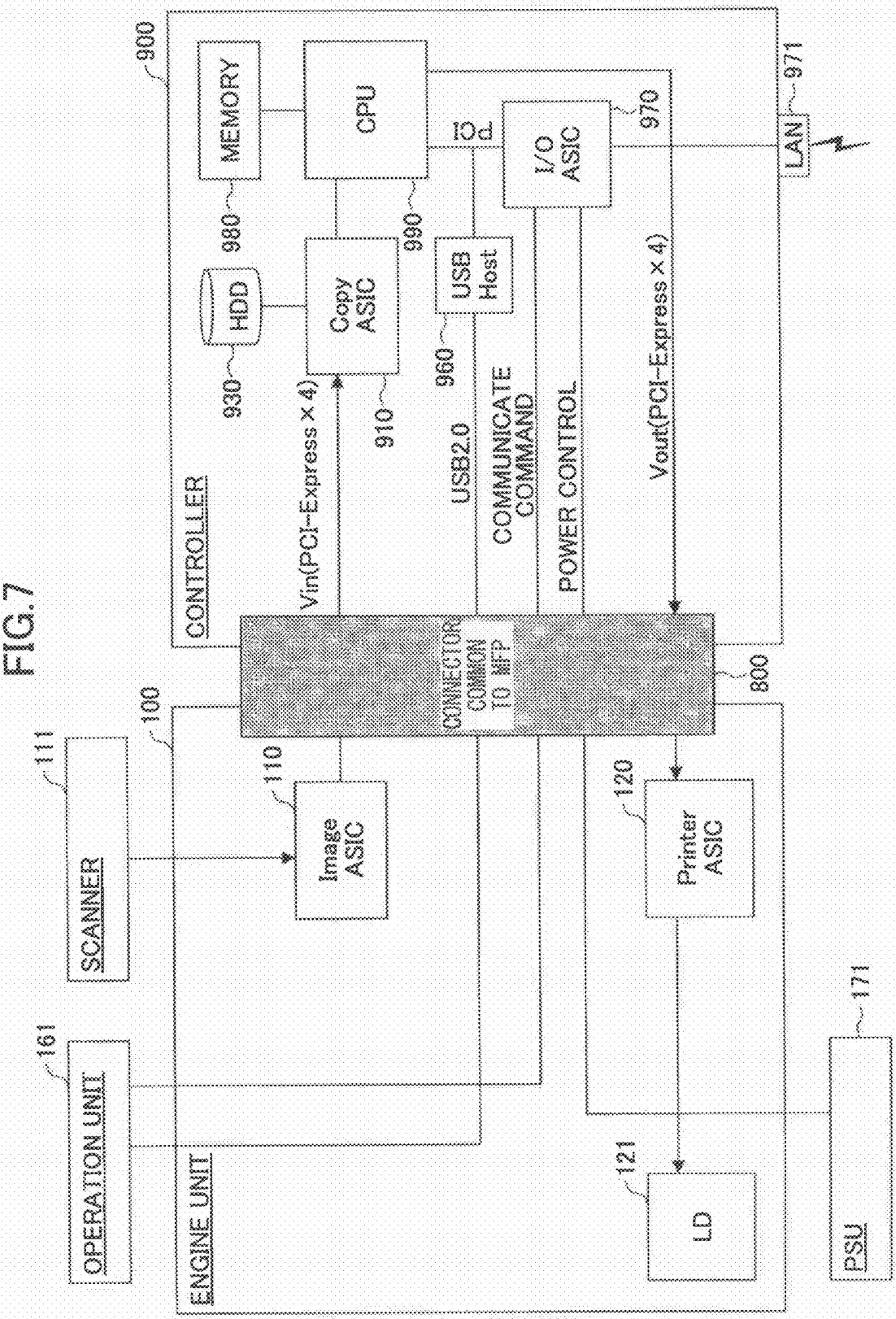
FIG. 7 illustrates an example of an image forming apparatus including a common printed circuit board and a common connector (part 1)

FIG. 7 illustrates a detailed configuration of an image forming apparatus according to an embodiment of the present invention. Specifically, FIG. 7 illustrates a controller and an engine unit controlled by a connector that is commonly used by different image forming apparatuses (hereinafter, "common connector") and a printed circuit board that is commonly used by different image forming apparatuses (hereinafter, "common printed circuit board"). The image forming apparatus shown in FIG. 7 includes, for example, the controller 900, the engine unit 100, a scanner 111, an operation unit 161, and a power source unit 171. The power source unit 171 is indicated as "PSU" in the figure.

The controller 900 is controlled by a printed circuit board, and includes, for example, the CPU 990, a memory 980, an I/O-ASIC 970, a network communication device 971, a USB host 960, a hard disk device 930, the Copy ASIC 910, and printed wiring connecting the aforementioned elements.

The CPU 990 controls the devices included in the image forming apparatus by executing a predetermined computer program. The memory 980 temporarily holds data when the CPU 990 executes a process. The memory 980 can also hold, for example, computer programs executed by the CPU 990, or the memory 980 can have a function for having the computer programs expanded in the memory 980 so that the computer programs are executable by the CPU 990.

The I/O-ASIC 970 controls data that are input to or output from the image forming apparatus or controls a device having such a function. Furthermore, the I/O-ASIC 970 controls the power source unit 171. The network communication device 971 performs communications between the image forming apparatus and an external device connected to the image forming apparatus via a network. The USB host 960 transmits/receives data to/from a USB device. For example, in FIG. 7, a display device included in the operation unit 161 is a USB device.

The hard disk device 930 stores high-volume data. The hard disk device 930 stores, for example, image data input from the scanner 111 or image data based on the image data that have been input from the scanner 111. The Copy ASIC 910 makes predetermined corrections on an image when performing a copying process in which image data that are input from the scanner 111 are output to the plotter.

The controller 900 includes printed wiring for connecting the above ASICs together and connecting the ASICs to the connector 800. One example of the printed wiring included in the controller 900 for the PCI-E bus is printed wiring corresponding to a channel including four lanes of the P-E for the connector 800 to transfer image data input from the scanner 111 to the Copy ASIC 910. Another example is printed wiring corresponding to a channel including four lanes of the P-E for the CPU 990 to transfer image data output to the plotter from the connector 800.

The controller 900 further includes the following printed wiring. There is printed wiring for controlling the power source, which printed wiring connects the connector 800 and the I/O-ASIC 970 so that the CPU 990 can control the power source unit 171 via the I/O-ASIC 970. There is also printed wiring for communicating commands by transmitting signals of instructions input from the operation unit 161. There is also printed wiring for transferring signals compliant with the USB 2.0 standard, which enables the USB host 960 to transfer, to the operation unit 161, data to be displayed on a screen.

The engine unit 100 performs various image processing procedures of the image forming apparatus, and is configured with a printed circuit board provided with ASICs corresponding to such image processing procedures. The engine unit 100 includes the Image ASIC 110, the Printer ASIC 120, and a laser disc (LD) 121.

The Image ASIC 110 generates image data based on signals input from the scanner 111. The Printer ASIC 120 generates image data to be output to the plotter (not shown). The LD 121 converts the image data processed by the Printer ASIC 120 from electrical signals into laser beams, and outputs the converted laser beams to the not-shown plotter. The LD 121 and another unit (not shown), which outputs image data in synchronization with the linear velocity of the plotter, can be configured as a single unit.

The engine unit 100 further includes the following printed wiring. There is printed wiring for a P-E bus connecting the above ASICs and the connector 800. There is also printed wiring for connecting the above ASICs and a device provided on the outside of the engine unit 100. Moreover, the engine unit 100 includes printed wiring for connecting a device provided on the outside of the engine unit 100 to the connector 800. For example, there is printed wiring for connecting the operation unit 161 and the controller 900 by connecting a terminal of the operation unit 161 and a terminal of the connector 800.

The scanner 111 is a device for outputting signals generated by optically reading an image. The operation unit 161 receives instructions for the image forming apparatus input by an operator or displays the status of the image forming apparatus. The power source unit 171 acquires power supplied to the image forming apparatus and sends it to the I/O-ASIC 970.

In addition to the configuration of the connector 800 shown in FIG. 6, the connector 800 includes terminals or terminal blocks corresponding to printed wiring for controlling the power source, printed wiring for communicating commands, and printed wiring for transferring signals compliant with the USB 2.0 standard. These terminals or terminal blocks can be configured in such a manner as to be compliant with their corresponding buses.

With the use of these terminal blocks, it is possible to make connections with a bus of the USB 2.0 standard, in addition to making connections with a P-E bus.

(Example of a Scanner Device Controlled by a Common Printed Circuit Board and a Common Connector)

Figure 8:
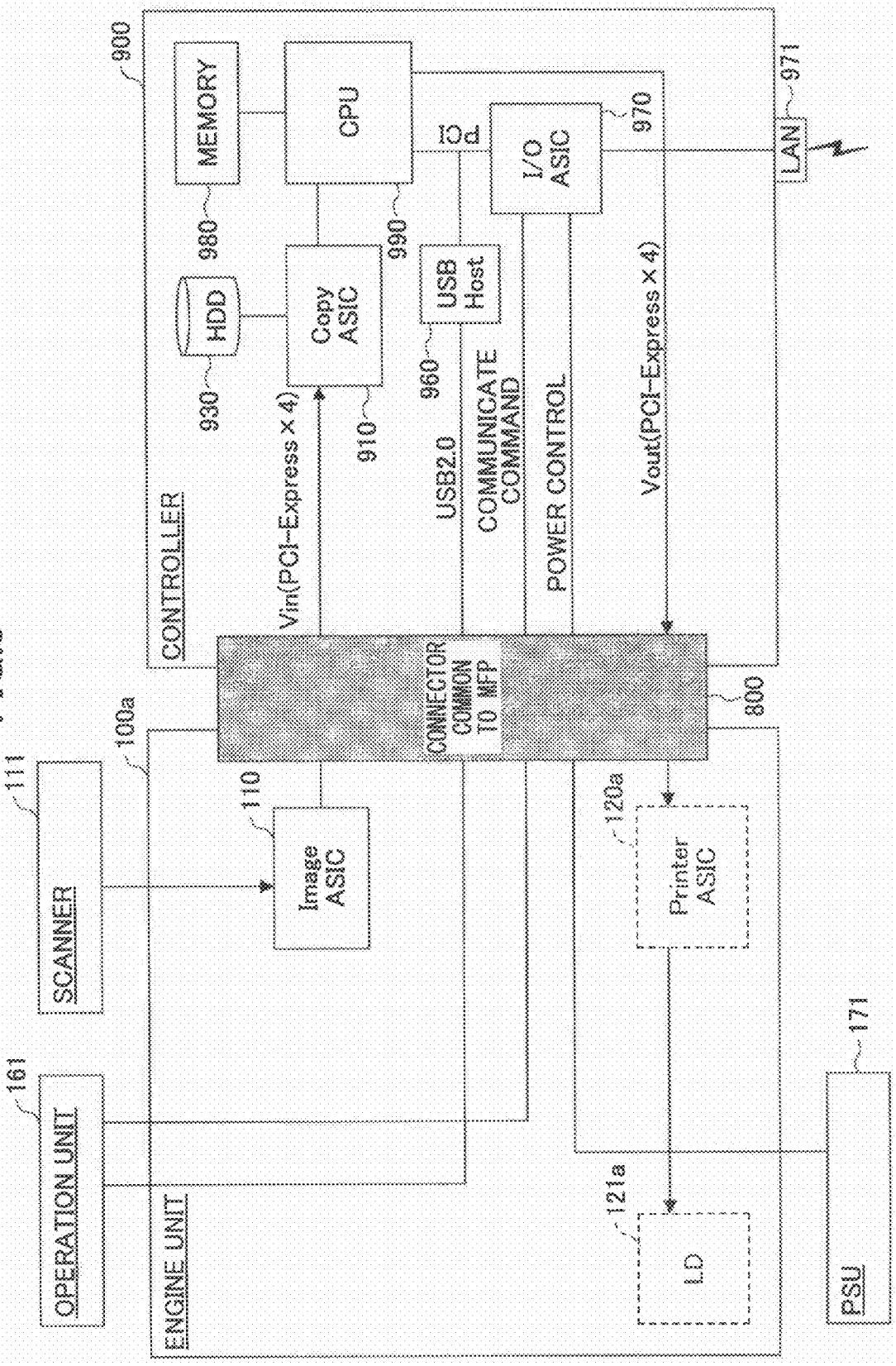
FIG. 8 illustrates an example of a scanner device controlled by a common printed circuit board and a common connector.

FIG. 8 illustrates an example of a scanner device including the controller 900 and an engine unit 100a controlled by a common printed circuit board and a common connector. The scanner device shown in FIG. 8 includes the same printed circuit board and the same connector as those of the image forming apparatus shown in FIG. 7. In the scanner device shown in FIG. 8, ASICs and devices having the same configurations as those of the image forming apparatus shown in FIG. 7 are denoted by the same reference numbers, and are thus not further described.

In the engine unit 100a of the scanner device shown in FIG. 8, the Printer ASIC 120 and the LD 121 are not mounted in a Printer ASIC installation position 120a or an LD installation position 121a, respectively. However, the printed wiring connected to these installation positions is provided in the same manner as that of the engine unit 100 of FIG. 7. Incidentally, when there is no "installation position", it means that terminals for installing the Printer ASIC or the LD are not provided on the printed wiring on the printed circuit board. With such a configuration, it is possible to connect the same printed circuit board as that of FIG. 7 by the same connector as that of FIG. 7, thereby controlling an image forming apparatus without a printer function.

(Example of a Printer Device Controlled by a Common Printed Circuit Board and a Common Connector)

Figure 9:
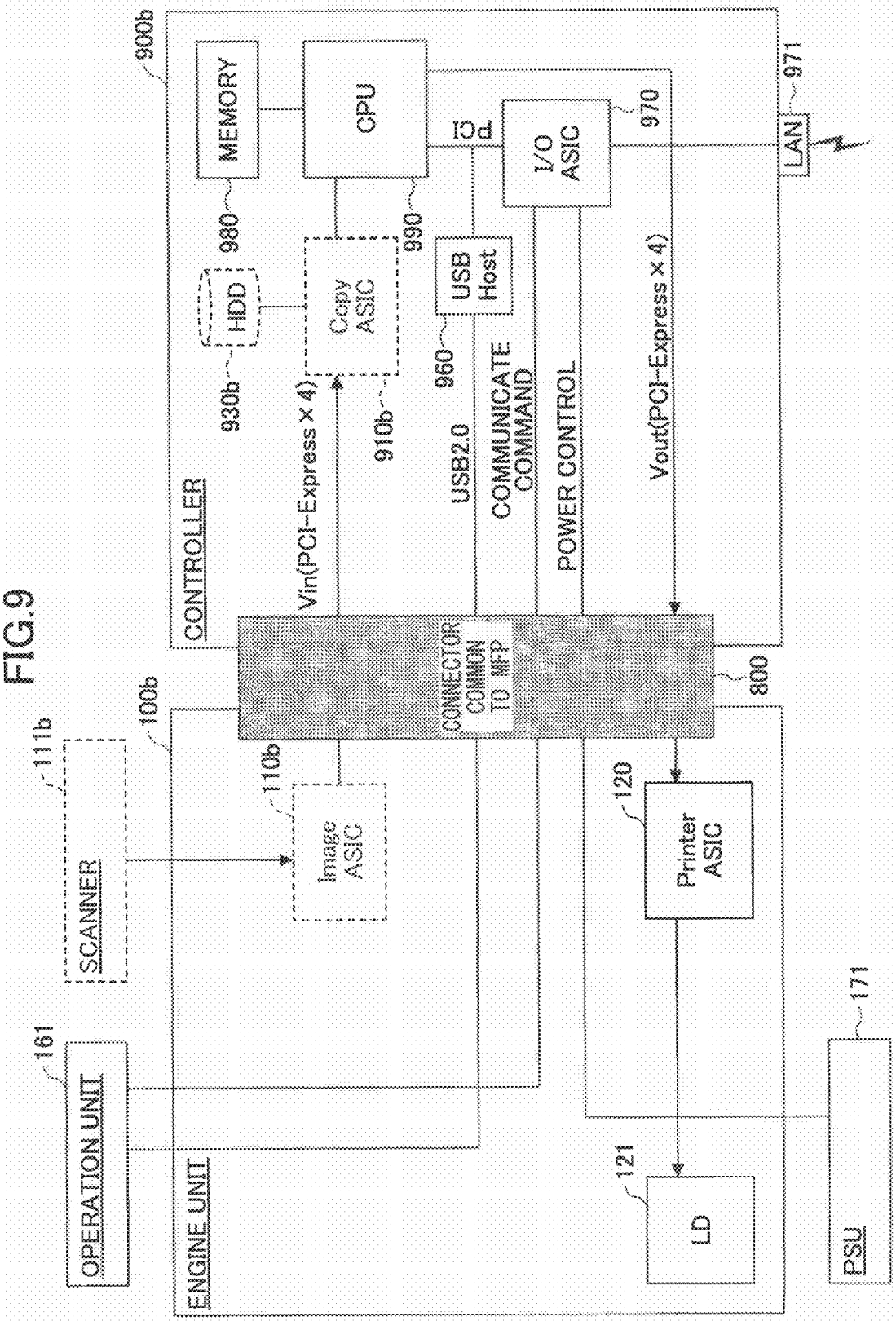
FIG. 9 illustrates an example of a printer device controlled by a common printed circuit board and a common connector.

FIG. 9 illustrates an example of a printer device including a controller 900b and an engine unit 100b controlled by a common printed circuit board and a common connector. The printer device shown in FIG. 9 includes the same printed circuit board and the same connector as those of the image forming apparatus shown in FIG. 7. In the printer device shown in FIG. 9, ASICs and devices having the same configurations as those of the image forming apparatus shown in FIG. 7 are denoted by the same reference numbers, and are thus not further described.

In the engine unit 100b of the scanner device shown in FIG. 9, the Image ASIC 110, the scanner 111, the Copy ASIC 910, and the hard disk device 930 are not mounted in an Image ASIC installation position 110b, a scanner installation position 111b of the engine unit 100b, a Copy ASIC installation position 910b, and a hard disk device installation position 930b of the controller 900b, respectively. However, the printed wiring connected to these installation positions is provided in the same manner as that of the engine unit 100 and the controller 900 of FIG. 7. With such a configuration, it is possible to connect the same printed circuit board as that of FIG. 7 by the same connector as that of FIG. 7, thereby controlling an image forming apparatus without a scanner function.

(Example of a Scanner Device Controlled by a Dedicated Printed Circuit Board and Common Connector)

Figure 10:
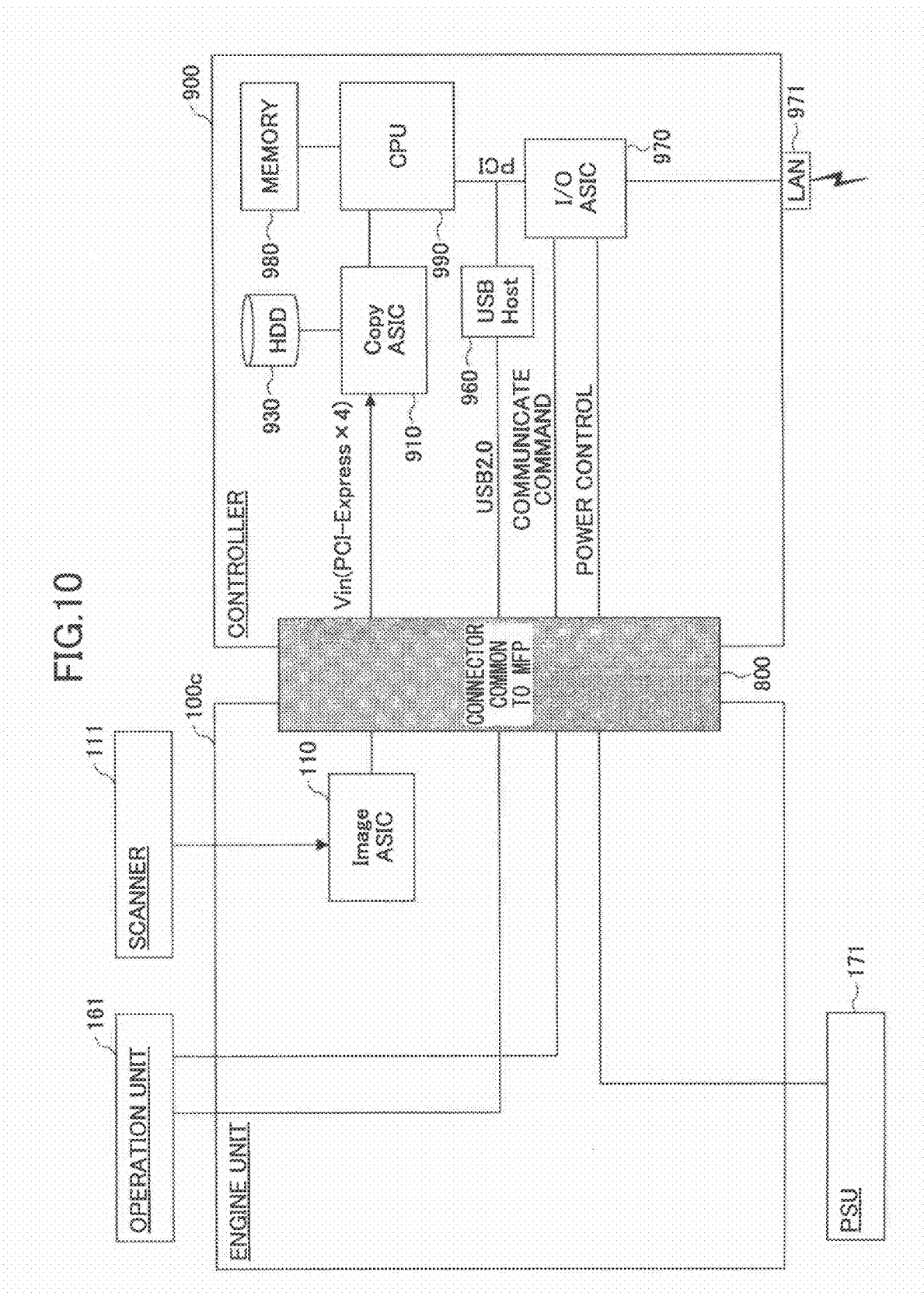
FIG. 10 illustrates an example of a scanner device controlled by a dedicated printed circuit board and a common connector.

FIG. 10 illustrates an example of a scanner device including the controller 900 controlled by a common printed circuit board, an engine unit 100c controlled by a dedicated printed circuit board, and a common connector. The controller 900 and the connector 800 of the scanner device shown in FIG. 10 have the same configurations as the controller 900 and the connector 800 of the scanner device shown in FIG. 8, and are thus not further described. In the engine unit 100c of the scanner device shown in FIG. 10, ASICs and devices having the same configurations as those of the engine unit 100 of the scanner device shown in FIG. 8 are denoted by the same reference numbers, and are thus not further described.

The engine unit 100c of the scanner device shown in FIG. 10 is not provided with the Printer ASIC installation position 120a or the LD installation position 121a of, for example, FIG. 8, nor is the engine unit 100c provided with printed wiring to be connected to such installation positions. However, the engine unit 100c is provided with other ASICs and printed wiring in the same manner as the engine unit 100 of FIG. 8. With such a configuration, it is possible to connect the engine unit 100c controlled by a different printed circuit board from that of FIG. 8 to the controller 900 by the same connector as that of FIG. 8, thereby controlling an image forming apparatus having the same scanner function as that of FIG. 8.

(Example of a Printer Device Controlled by a Dedicated Printed Circuit Board and a Common Connector)

Figure 11:
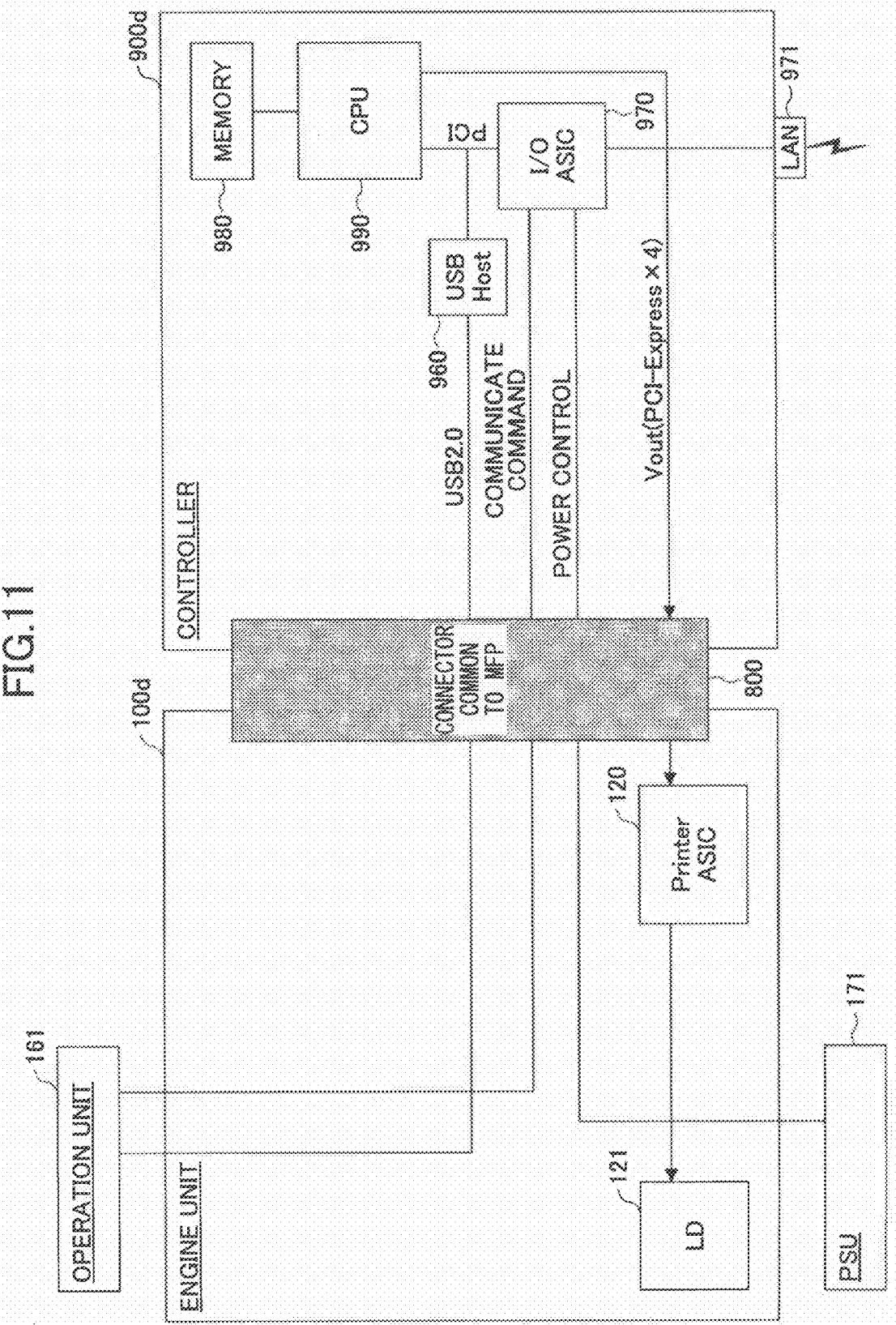
FIG. 11 illustrates an example of a printer device controlled by a dedicated printed circuit board and a common connector.

FIG. 11 illustrates an example of a printer device including a controller 900d and an engine unit 100d controlled by a dedicated printed circuit board and a common connector. The connector 800 of the printer device shown in FIG. 11 has the same configuration as that of the printer device shown in FIG. 9, and is thus not further described. In the controller 900d and the engine unit 100d of the printer device shown in FIG. 11, ASICs having the same configurations as those of the controller 900b and the engine unit 100b of the printer device shown in FIG. 9 are denoted by the same reference numbers, and are thus not further described. Furthermore, the functions and configurations of the operation unit 161 and the power source unit 171 are the same as the devices in FIG. 7 denoted by the same reference numbers, and are thus not further described.

The printed circuit board of the engine unit 100d of the printer device shown in FIG. 11 is not provided with the Image ASIC installation position 110b of the engine unit 100b of the printer device of FIG. 9, nor is the engine unit 100d provided with printed wiring to be connected to such an installation position. However, the engine unit 100d is provided with other ASICs and printed wiring in the same manner as the engine unit 100b of FIG. 9.

Furthermore, the printed circuit board of the controller 900d of the printer device shown in FIG. 11 is not provided with the Copy ASIC installation position 910b or the hard disk device installation position 930b of the controller 900b of the printer device of FIG. 9, nor is the controller 900d provided with printed wiring to be connected to such installation positions. However, the controller 900d is provided with other ASICs and printed wiring in the same manner as the controller 900b of FIG. 9.

With such a configuration, it is possible to connect together the engine unit 100d and the controller 900d controlled by different printed circuit boards from those of FIG. 9 by the same connector 800 as that of FIG. 9, thereby controlling an image forming apparatus without a scanner function similar to that of FIG. 9.

(Example of a Scanner Device Controlled by a Common Printed Circuit Board and a Dedicated Connector)

Figure 12:
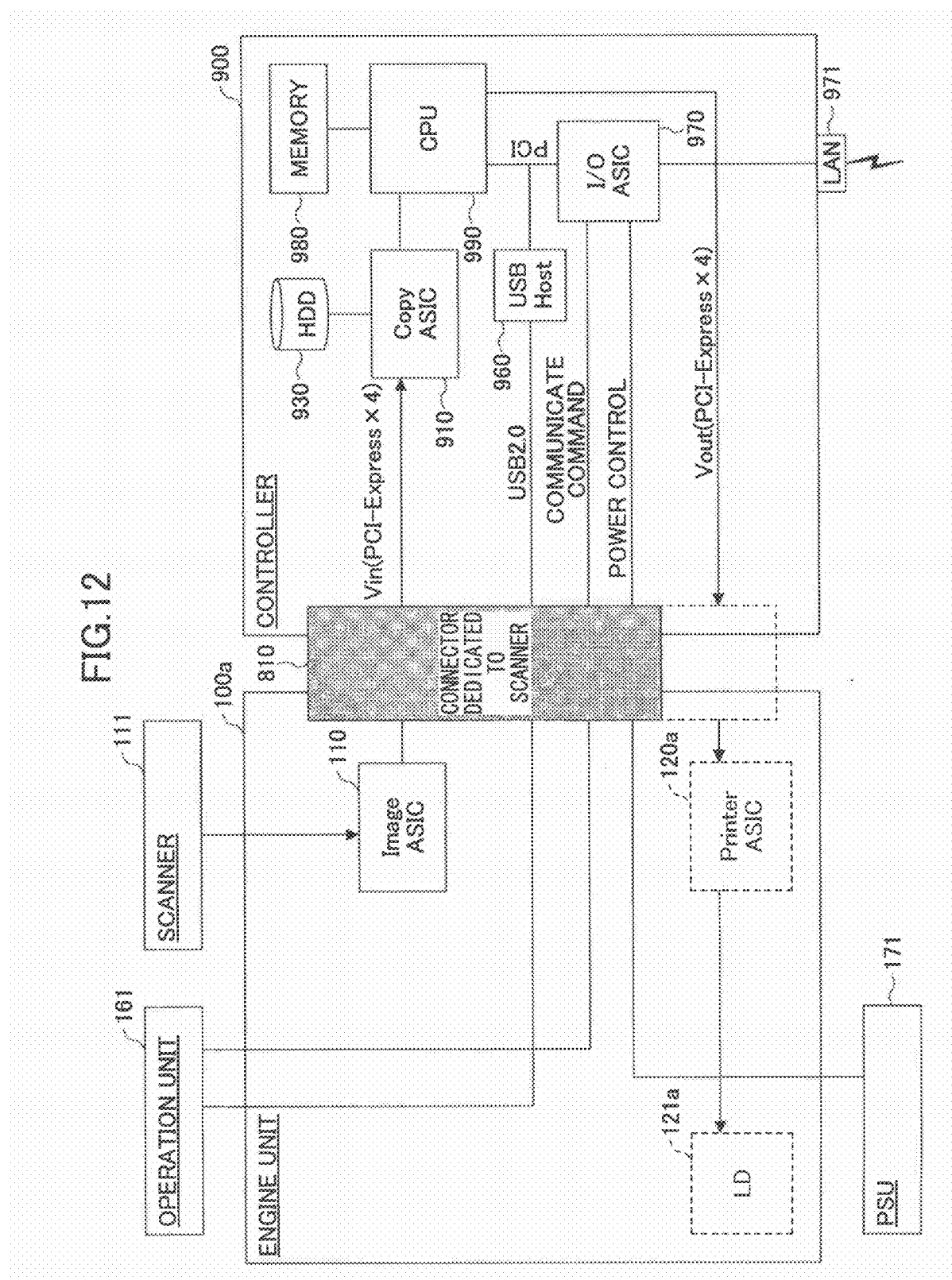
FIG. 12 illustrates an example of a scanner device controlled by a common printed circuit board and a dedicated connector.

FIG. 12 illustrates an example of a scanner device including the controller 900 and the engine unit 100a controlled by a common printed circuit board and a dedicated connector. The controller 900 shown in FIG. 12 has the same function and configuration as the controller 900 shown in FIG. 7, and is thus not further described. The engine unit 100a shown in FIG. 12 has the same function and configuration as the engine unit 100a shown in FIG. 8, and is thus not further described. Furthermore, the functions and configurations of the scanner 111, the operation unit 161, and the power source unit 171 are the same as the devices in FIG. 7 denoted by the same reference numbers, and are thus not further described.

A connector 810 included in the scanner device of FIG. 12 has a different configuration from that of the connector 800 shown in FIGS. 7 through 11. For example, the connector 810 is not provided with the part for connecting printed wiring to be connected to an ASIC pertaining to a printer function that is not included in the scanner device shown in FIG. 12. The connector 810 can have a configuration that does not include any of the parts pertaining to a printer function as illustrated in FIG. 12, or the connector 810 can have a configuration that does not include a terminal block pertaining to a printer function but does have the same casing as that of the connector 800.

With such a configuration, it is possible to connect together the controller 900 and the engine unit 100a by a single connector 810, thereby controlling an image forming apparatus having a scanner function.

(Example of a Printer Device Controlled by a Common Printed Circuit Board and Dedicated Connector)

Figure 13:
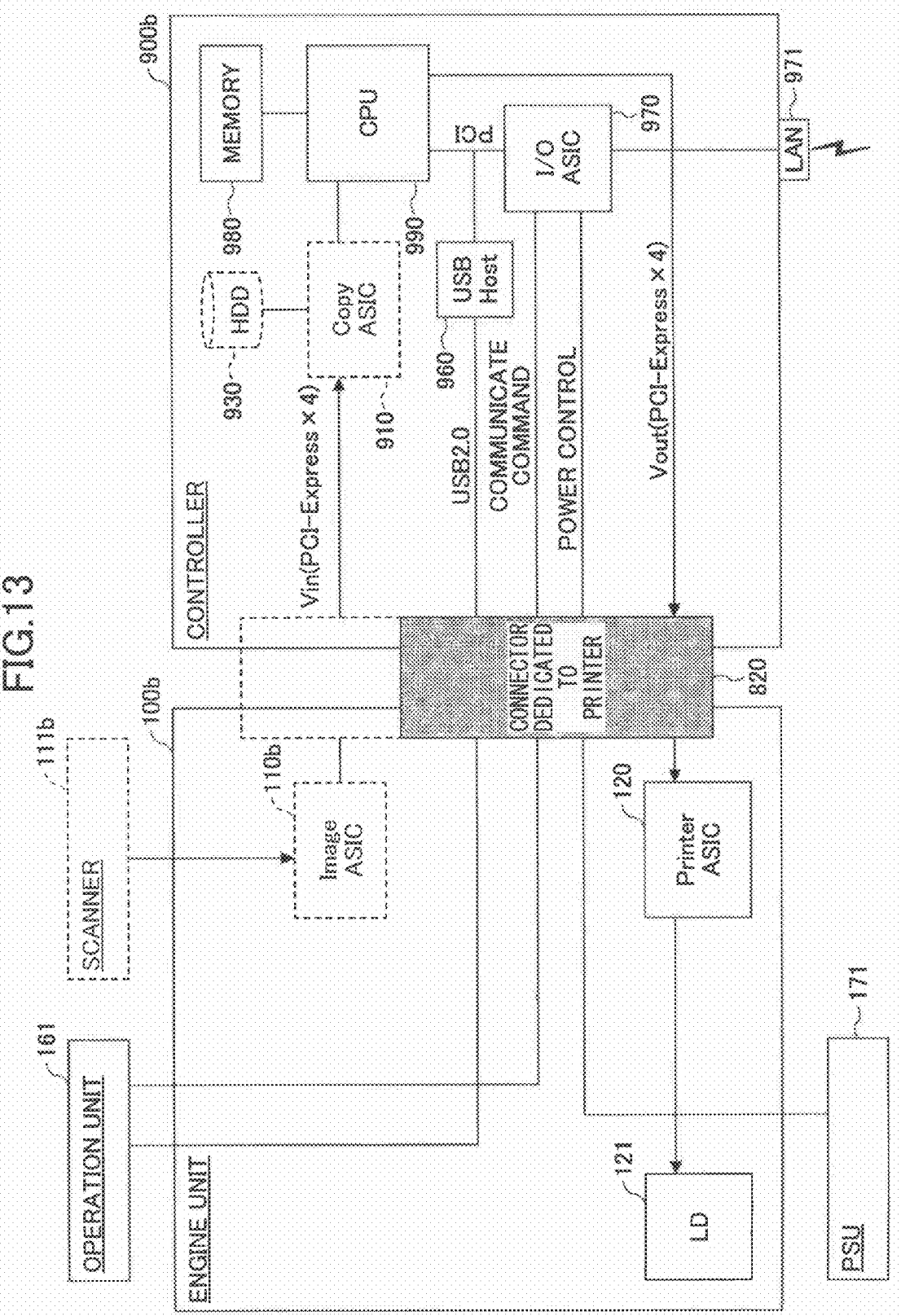
FIG. 13 illustrates an example of a printer device controlled by a common printed circuit board and a dedicated connector.

FIG. 13 illustrates an example of a printer device including the controller 900b and the engine unit 100b controlled by a common printed circuit board and a dedicated connector. The controller 900b shown in FIG. 13 has the same function and configuration as the controller 900b shown in FIG. 9, and the engine unit 100b shown in FIG. 13 has the same function and configuration as the engine unit 100b shown in FIG. 9, and are thus not further described. Furthermore, the functions and configurations of the operation unit 161 and the power source unit 171 are the same as the devices in FIG. 7 denoted by the same reference numbers, and are thus not further described.

A connector 820 included in the printer device of FIG. 13 has a different configuration from that of the connector 800 shown in FIGS. 7 through 11 or the connector 810 shown in FIG. 12. For example, the connector 820 is not provided with the part for connecting printed wiring to be connected to an ASIC pertaining to a scanner function that is not included in the printer device shown in FIG. 13. The connector 820 can have a configuration that does not include any of the parts pertaining to a scanner function as illustrated in FIG. 13, or the connector 820 can have a configuration that does not include a terminal block pertaining to a scanner function, but does have the same casing as that of the connector 800.

With such a configuration, it is possible to connect together the controller 900b and the engine unit 100b by a single connector 820, thereby controlling an image forming apparatus having a printer function.

(Example of a Scanner Device Controlled by Dedicated Printed Circuit Board and Dedicated Connector)

Figure 14:
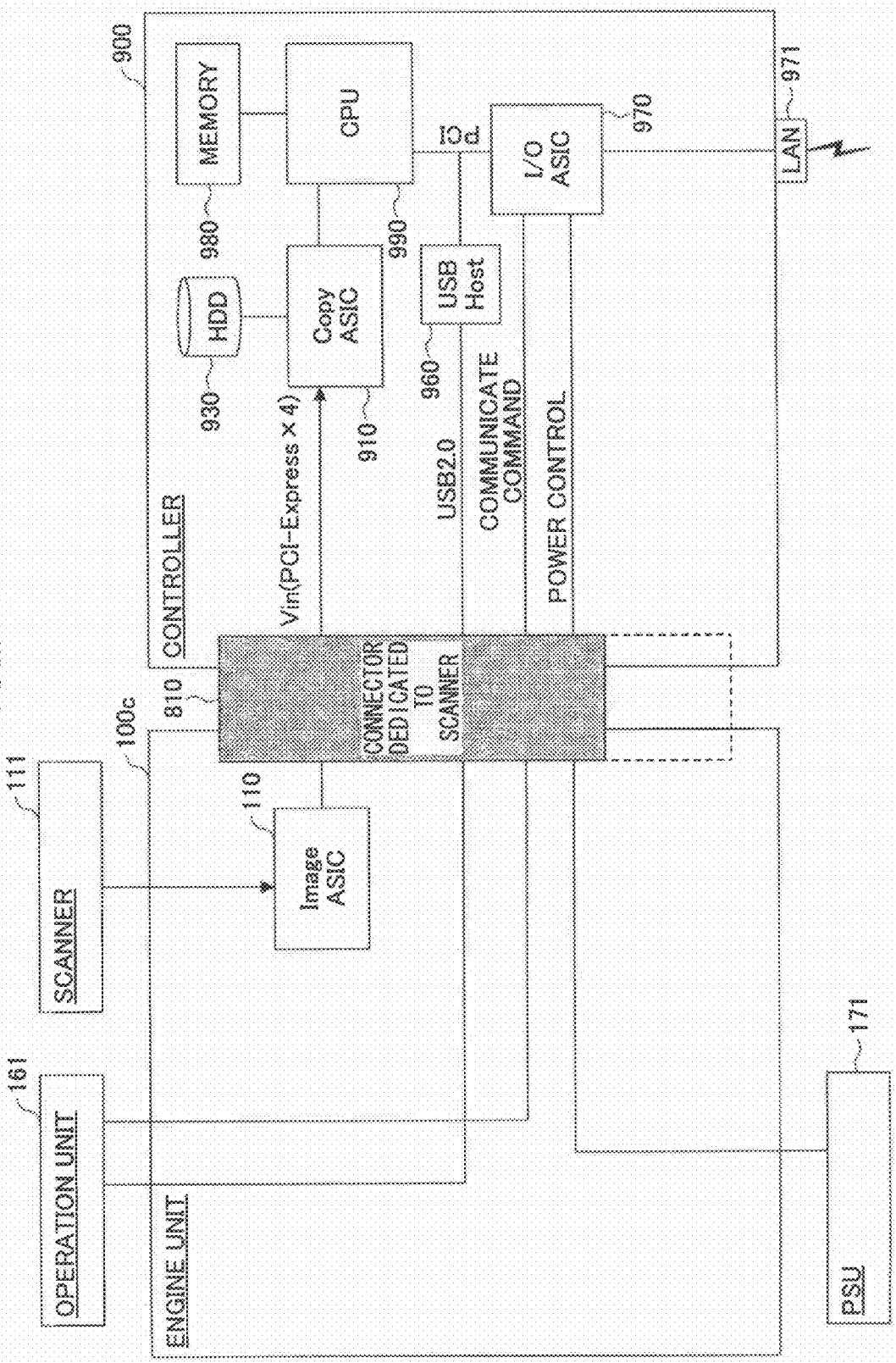
FIG. 14 illustrates an example of a scanner device controlled by a dedicated printed circuit board and a dedicated connector.

FIG. 14 illustrates an example of a scanner device including the controller 900 controlled by a common printed circuit board, the engine unit 100c controlled by a dedicated printed circuit board, and a dedicated connector. The controller 900 shown in FIG. 14 has the same function and configuration as the controller 900 shown in FIG. 7, and the engine unit 100c shown in FIG. 14 has the same function and configuration as the engine unit 100c shown in FIG. 10, and are thus not further described. Furthermore, the functions and configurations of the scanner 111, the operation unit 161, and the power source unit 171 are the same as the devices in FIG. 7 denoted by the same reference numbers, and are thus not further described.

The connector 810 included in the scanner device of FIG. 14 has a different configuration from that of the connector 800 shown in FIGS. 7 through 11, and has the same configuration as that of the connector 810 of the scanner device shown in FIG. 12. For example, the connector 810 is only provided with the part for connecting printed wiring to be connected to an ASIC pertaining to a scanner function that is included in the scanner device shown in FIG. 14. The connector 810 can have a configuration that only includes parts pertaining to a scanner function as illustrated in FIG. 14, or the connector 810 can have a configuration that does not include a terminal block pertaining to a printer function included in the connector 800, but does have the same casing as that of the connector 800.

With such a configuration, it is possible to connect together the controller 900 and the engine unit 100c by a single connector 810, thereby controlling an image forming apparatus having a scanner function.

(Example of a Printer Device Controlled by a Dedicated Printed Circuit Board and a Dedicated Connector—Part 1—)

Figure 15:
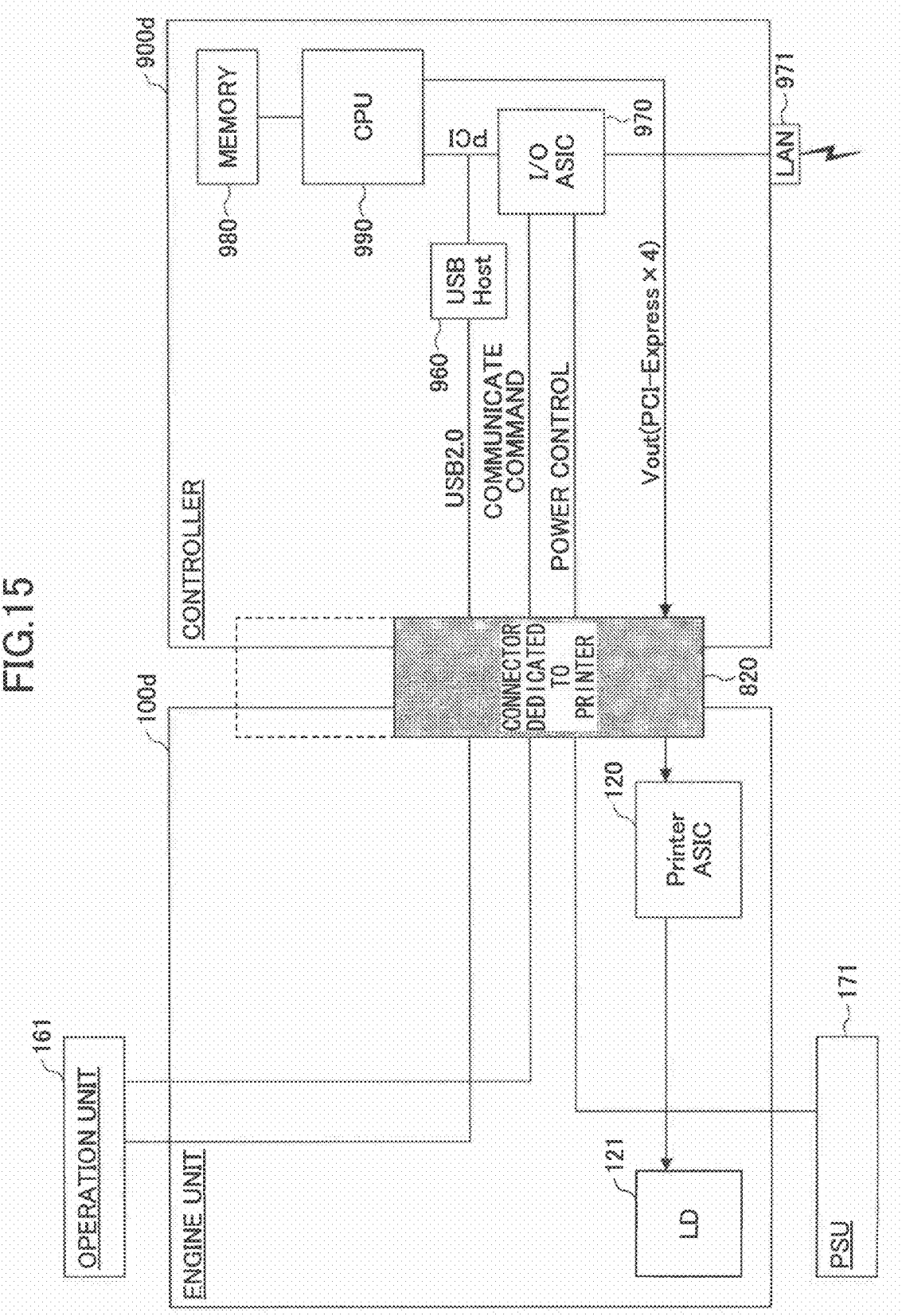
FIG. 15 illustrates an example of a printer device controlled by a dedicated printed circuit board and a dedicated connector (part 1)

FIG. 15 illustrates an example of a printer device including the controller 900d and the engine unit 100d controlled by a dedicated printed circuit board and a dedicated connector. The controller 900d and the engine unit 100d shown in FIG. 15 have the same Functions and configurations as the controller 900d and the engine unit 100d shown in FIG. 11, and are thus not further described. Furthermore, the functions and configurations of the operation unit 161 and the power source unit 171 are the same as the devices in FIG. 7 denoted by the same reference numbers, and are thus not further described.

The connector 820 included in the printer device of FIG. 15 has a different configuration from that of the connector 800 shown in FIGS. 7 through 11, and has the same configuration as that of the connector 820 of the scanner device shown in FIG. 13. For example, the connector 820 can have a configuration that only includes parts pertaining to a printer function as illustrated in FIG. 15, or the connector 820 can have a configuration that does not include a terminal block corresponding to the terminal block pertaining to a printer function included in the connector 800, but does have the same casing as that of the connector 800.

With such a configuration, it is possible to connect together the controller 900d and the engine unit 100d by a single connector 820, thereby controlling an image forming apparatus having a printer function.

(Example of a Printer Device Controlled by a Dedicated Printed Circuit Board and a Dedicated Connector—Part 2—)

Figure 16:
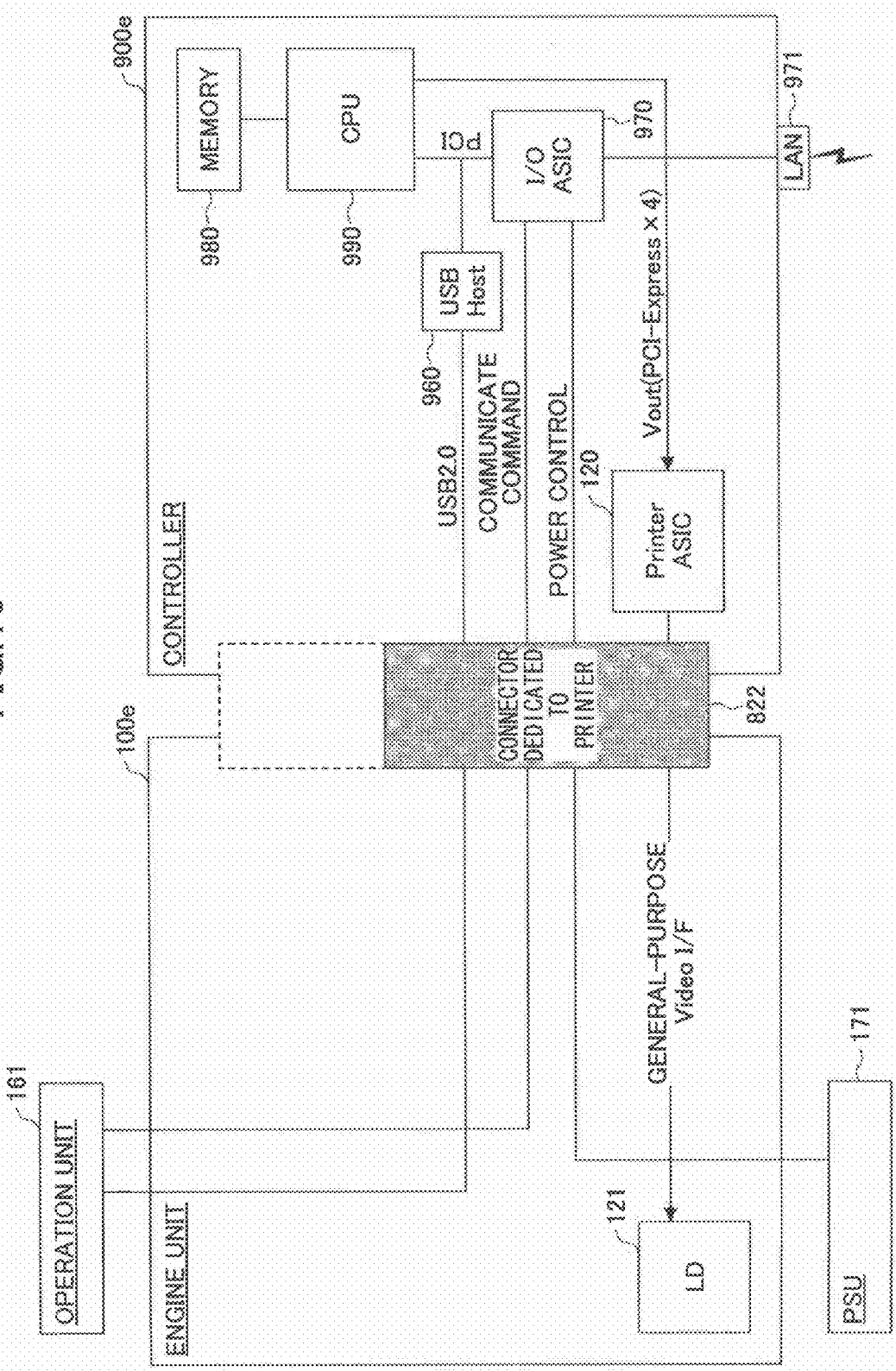
FIG. 16 illustrates an example of a printer device controlled by a dedicated printed circuit board and a dedicated connector (part 2)

FIG. 16 illustrates an example of a printer device including a controller 900e and an engine unit 100e controlled by dedicated printed circuit boards and a connector 822 that is a dedicated connector. The ASICs in the controller 900e and the engine unit 100e shown in FIG. 16 have the same functions and configurations as the ASICs in FIG. 7 denoted by the same reference numbers, and are thus not further described. Furthermore, the functions and configurations of the operation unit 161 and the power source unit 171 are the same as the devices in FIG. 7 denoted by the same reference numbers, and are thus not further described.

The engine unit 100e shown in FIG. 16 does not include the Printer ASIC 120 included in the engine unit 100 shown in FIG. 7. The Printer ASIC 120 is provided in the controller 900e. Accordingly, signals output from the Printer ASIC 120 to the connector 822 become compliant with a general-purpose interface for images. Therefore, this configuration is different from that of, for example, FIG. 7, in which signals compliant with the P-E are transferred by printed wiring provided at the same position.

Accordingly, the connector 822 of the printer device shown in FIG. 16 includes a terminal block for signals of general-purpose image data output from the Printer ASIC 120, instead of the terminal block for signals compliant with the P-E included in the connector 820.

With such a configuration, it is possible to connect together the controller 900e and the engine unit 100e by a single connector 822, thereby controlling an image forming apparatus having a printer function.

(Example of Image Forming Apparatus Including Common Printed Circuit Board and Common Connector—Part 2—)

Figure 17:
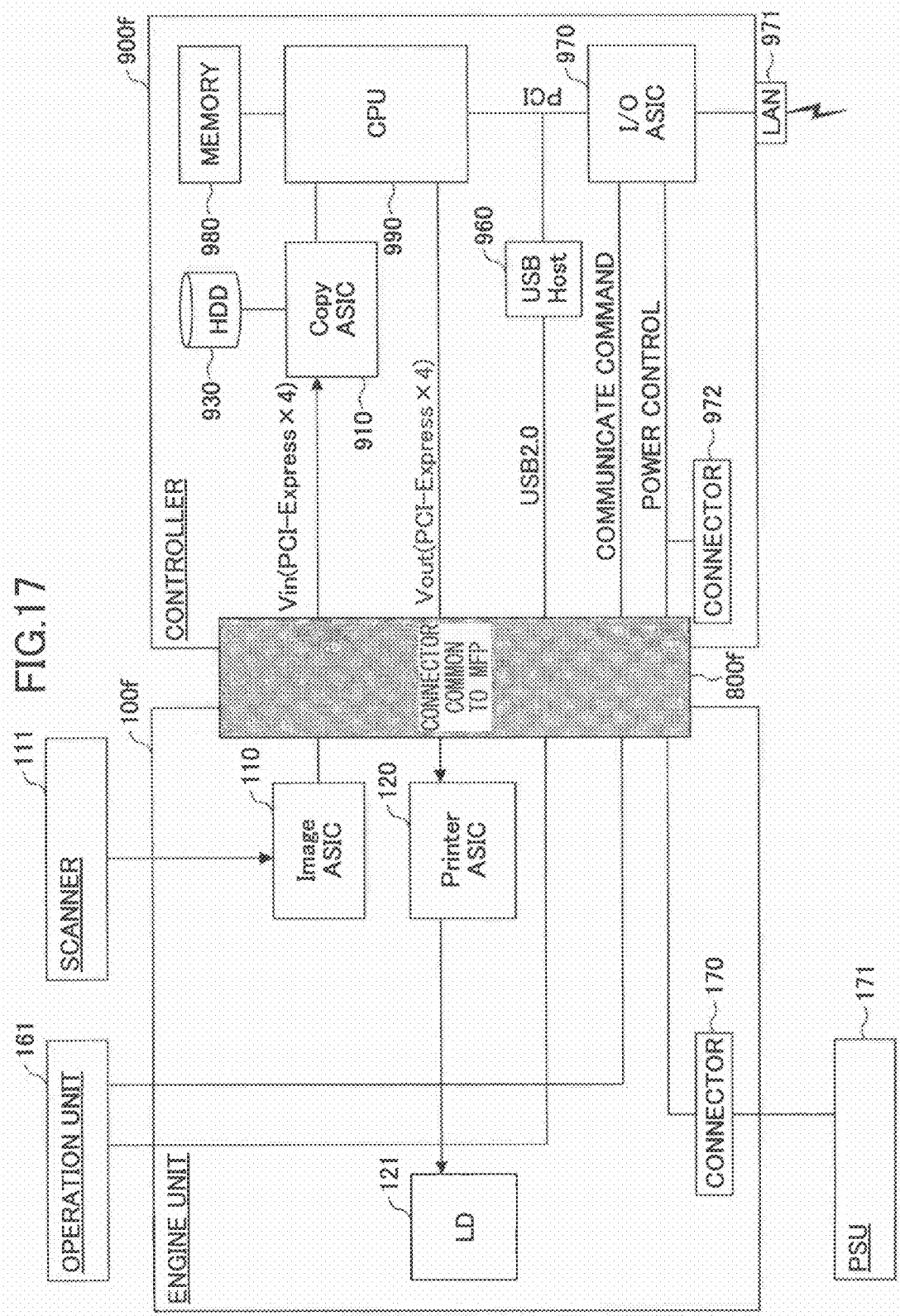
FIG. 17 illustrates an example of an image forming apparatus including a common printed circuit board and a common connector (part 2)

FIG. 17 illustrates an example of an image forming apparatus including a controller 900f and an engine unit 100f controlled by a common printed circuit board and a connector 800f that is a common connector. The ASICs in the controller 900f and the engine unit 100f shown in FIG. 17 have the same functions and configurations as the ASICs in FIG. 7 denoted by the same reference numbers, and are thus not further described. Furthermore, the functions and configurations of the scanner 111, the operation unit 161, and the power source unit 171 are the same as the devices in FIG. 7 denoted by the same reference numbers, and are thus not further described.

The ASICs in the engine unit 100f and the controller 900f shown in FIG. 17 are arranged differently from those in the engine unit 100 and the controller 900 shown in FIG. 7, but the functions performed are substantially the same. The difference is that the engine unit 100f and the controller 900f include a connector 170 and a connector 972, respectively, for connecting the power source unit 171. The connector 170 and the connector 972 are connected to wiring for controlling the power source. The power source unit 171 is detachably attached with respect to the connector 170 and the connector 972.

The terminal blocks included in the connector 800f are arranged differently from those in the connector 800 to correspond to the arrangement of the ASICs and the printed wiring included in the engine unit 100f and the controller 900f. However, the functions performed are the same, and are thus not further described.

With such a configuration, it is possible to connect together the controller 900f and the engine unit 100f by a single connector 800f, thereby controlling an image forming apparatus having a printer function.

(Example of an External Storage Device Controlled by a Common Printed Circuit Board)

Figure 18:
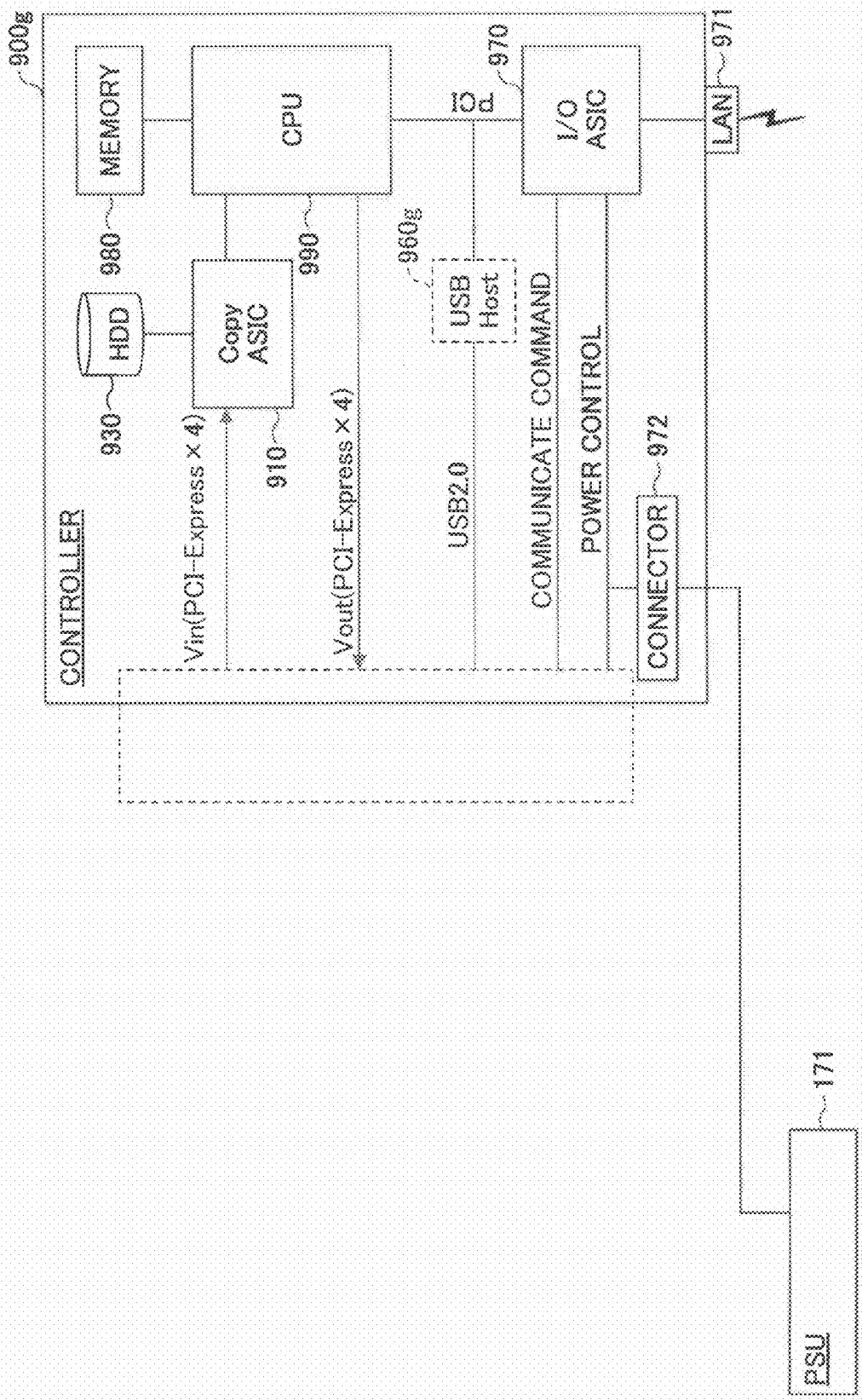
FIG. 18 illustrates an example of an external storage device controlled by a common printed circuit board.

FIG. 18 illustrates an example where the controller 900f, which is included in the image forming apparatus of FIG. 17, is configured as an external storage device. The external storage device of FIG. 18 is connected to the power source unit 171, and includes a controller 900g. The controller includes, for example, the CPU 990, the memory 980, the I/O-ASIC 970, the network communication device 971, and the Copy ASIC 910.

The CPU 990 and the memory 980 control other devices such as the hard disk device 930. The I/O-ASIC 970 controls the network communication device 971. The network communication device 971 transmits/receives data to/from the outside.

The image processing function of the Copy ASIC 910 is unnecessary when this device is configured as an external storage device. However, data output from the CPU 990 are transmitted to the hard disk device 930 through the Copy ASIC 910. Therefore, the image processing function is provided in the controller 900g configured as the external storage device according to an embodiment of the present invention.

The controller 900g is formed with the same printed circuit board as that of the controller 900f of FIG. 17. However, the USB host 960 is not mounted on a USB host installation position 960g. Furthermore, the controller 900g is not provided with printed wiring to be connected to a terminal of the connector 800f, which printed wiring is included in the controller 900f of FIG. 17.

With such a configuration, it is possible to control an external storage device with the use of the same printed circuit board as that of the controller 900f of FIG. 17.

In an embodiment of the present invention, the ASICs or the devices are provided on printed circuit boards of the controllers 900 and 900a through 900g or the engine units 100 and 100a through 100f. However, units for performing functions of these ASICs or the devices need not be provided on the printed circuit boards. The printed circuit boards can be provided with interfaces for the units performing the functions, and these interfaces can be connected to such units.

Furthermore, in an embodiment of the present invention, the Image ASIC 110, the Printer ASIC 120, and the Copy ASIC 910 can be configured with an LSI. Alternatively, these can be configured with a device including plural circuits each performing the same process on images as its corresponding ASIC. Alternatively, these can be configured with software.

More specifically, the printed circuit board or the printed wiring board according to an embodiment of the present invention can be provided with printed wiring without having ASICs mounted thereon.

The scanner device according to an embodiment of the present invention does not include a function for forming an image on a medium, but is regarded as a type of "image forming apparatus" because it forms image data optically scanned by the scanner 111.

According to one embodiment of the present invention, an image forming apparatus includes an image processing device including plural image processing units; a control device configured to control the plural image processing units; and a connection unit configured to connect the image processing device to the control device, wherein each of the plural image processing units is connected to the control device by one of plural channels; the image processing device is connected to the control device by a first bus including the channels; and the connection unit is provided on the first bus so that the image processing device is connected to the control device by a single connection unit.

Accordingly, an image forming apparatus can be provided, in which a control device and an image processing device in the image forming apparatus are connected by a single connection unit.

Additionally, according to one embodiment of the present invention, in the image forming apparatus, a bus width of the first bus can be changed according to a number of the channels.

Accordingly, an image forming apparatus can be provided, including the connection unit provided on a bus whose bus width can be changed.

Additionally, according to one embodiment of the present invention, in the image forming apparatus, the connection unit includes terminal blocks, wherein each of the terminal blocks corresponds to one of the image processing units, and each of the terminal blocks includes terminals corresponding to signals that are input to or output from the corresponding one of the image processing units.

Accordingly, it is possible to implement a configuration in which wiring to be connected to a terminal included in the connection unit and to one of the image processing units does not intersect with wiring to be connected to another image processing unit.

Additionally, according to one embodiment of the present invention, in the image forming apparatus, the control device includes plural control units; and the connection unit includes terminal blocks, wherein each of the terminal blocks corresponds to one of the control units, and each of the terminal blocks includes terminals corresponding to signals that are input to or output from the corresponding one of the control units.

Accordingly, it is possible to implement a configuration in which wiring to be connected to a terminal included in the connection unit and to one of the control units does not intersect with wiring to be connected to another control unit.

Additionally, according to one embodiment of the present invention, in the image forming apparatus, the terminal blocks include a control signal terminal block corresponding to channel control signals commonly included in the channels; and a transfer signal terminal block corresponding to signals other than the channel control signals among signals transferred by the channels.

Accordingly, a channel control signal commonly included in the channels can be commonly used among plural image processing units or plural control units.

Additionally, according to one embodiment of the present invention, in the image forming apparatus, in the control device, the control units are arranged in such a manner as to correspond to an arrangement of the terminal blocks included in the connection unit, each of which terminal blocks includes the terminals corresponding to the signals that are input to or output from the corresponding one of the control units.

Accordingly, it is possible to implement a configuration in which wiring to be connected to a terminal included in the connection unit and to one of the control units does not intersect with wiring to be connected to another control unit.

Additionally, according to one embodiment of the present invention, in the image forming apparatus, in the image processing device, the image processing units are arranged in such a manner as to correspond to an arrangement of the terminal blocks included in the connection unit, each of which terminal blocks includes the terminals corresponding to the signals that are input to or output from the corresponding one of the image processing units.

Accordingly, it is possible to implement a configuration in which wiring to be connected to a terminal included in the connection unit and to one of the image processing units does not intersect with wiring to be connected to another image processing unit.

Additionally, according to one embodiment of the present invention, in the image forming apparatus, the first bus includes a bus defined by a P-E specification.

Accordingly, in an image forming apparatus in which an image processing device and a control device are connected by a PCI-Express (registered trademark) bus, the connection unit can be provided on the bus so that the image processing device and the control device are connected by a single connection unit.

Additionally, according to one embodiment of the present invention, in the image forming apparatus, the image processing device and the control device are further connected by a second bus different from the first bus; and the connection unit includes a terminal or a terminal block corresponding to the second bus.

Accordingly, an image processing device and a control device that are connected by a first bus and a second bus can be connected by a single connection unit.

Additionally, according to one embodiment of the present invention, the image processing device and the control device included in the above-described image forming apparatus, or a connection device for connecting the image processing device and the control device, can be provided.

The present invention is not limited to the specifically disclosed embodiment, and variations and modifications may be made without departing from the scope of the present invention.

What is claimed is:

1. An image forming apparatus, comprising:
an image handling device including plural image handling units;
a control device configured to control the plural image handling units; and
a connection unit configured to connect the image handling device to the control device, wherein
each of the plural image handling units is physically connected to the control device,
the image handling device is connected to the control device,
the plural image handling units output signals that are connected to the connection unit, and
the connection unit is provided so that the image handling device is connected to the control device by a single connection unit.

2. The image forming apparatus according to claim 1, wherein
the connection unit includes terminal blocks, wherein each of the terminal blocks corresponds to one of the image handling units, and each of the terminal blocks includes terminals corresponding to signals that are input to or output from the corresponding one of the image handling units.

3. The image forming apparatus according to claim 2, wherein
in the image handling device, the image handling units are arranged in such a manner as to correspond to an arrangement of the terminal blocks included in the connection unit, each of which terminal blocks includes the terminals corresponding to the signals that are input to or output from the corresponding one of the image handling units.

4. The image forming apparatus according to claim 1, wherein
the control device includes plural control units; and
the connection unit includes terminal blocks, wherein each of the terminal blocks corresponds to one of the control units, and each of the terminal blocks includes terminals corresponding to signals that are input to or output from the corresponding one of the control units.

5. The image forming apparatus according to claim 4, wherein
in the control device, the control units are arranged in such a manner as to correspond to an arrangement of the terminal blocks included in the connection unit, each of which terminal blocks includes the terminals corresponding to the signals that are input to or output from the corresponding one of the control units.

6. The image forming apparatus according to claim 2, wherein the terminal blocks further include
a control signal terminal block corresponding to channel control signals, and
a transfer signal terminal block corresponding to signals other than the channel control signals.

7. The image forming apparatus according to claim 1, wherein
the image handling device and the control device are connected by a first bus, and
the connection unit includes a terminal or a terminal block corresponding to the first bus.

8. The image forming apparatus according to claim 1, wherein
each of the plural image handling units is directly connected to the control device.

9. An image handling device provided in an image forming apparatus, wherein
the image handling device is connected to a control device provided in the image forming apparatus by a single connection unit,
the image handling device includes plural image handling units,
each of the plural image handling units is connected to the control device,
the image handling device is connected to the control device,
the connection unit is provided so that the image handling device is connected to the control device by a single connection unit, and
the image handling units are arranged in such a manner as to correspond to an arrangement of terminal blocks included in the connection unit, wherein each of the terminal blocks corresponds to one of the image handling units, and each of the terminal blocks includes terminals corresponding to signals that are input to or output from the corresponding one of the image handling units.

10. A control device provided in an image forming apparatus, wherein
the control device is connected to an image handling device provided in the image forming apparatus by a single connection unit,
the control device includes plural control units, each of the plural control units is connected to the image handling device, the control device is connected to the image handling device, the connection unit is provided so that the control device is connected to the image handling device by a single connection unit, and the control units are arranged in such a manner as to correspond to an arrangement of terminal blocks included in the connection unit, wherein each of the terminal blocks corresponds to one of the control units, and each of the terminal blocks includes terminals corresponding to signals that are input to or output from the corresponding one of the control units.

11. A connection device for connecting a first device including plural first units to a second device including plural second units, wherein each of the plural first units is physically connected to one of the plural second units, the first device is connected to the second device, a connection unit is provided so that the first device is connected to the second device by a single connection unit, the plural first units output signals that are connected to the connection unit, and the connection unit includes terminal blocks, wherein each of the terminal blocks corresponds to one of the first units, and each of the terminal blocks includes terminals corresponding to signals that are input to or output from the corresponding one of the first units.

12. A connection device for connecting a first device including plural first units to a second device including plural second units, wherein each of the plural first units is physically connected to one of the plural second units, the first device is connected to the second device, a connection unit is provided so that the first device is connected to the second device by a single connection unit, the plural first units output signals that are connected to the connection unit, and the connection unit includes terminal blocks, wherein each of the terminal blocks corresponds to one of the second units, and each of the terminal blocks includes terminals corresponding to signals that are input to or output from the corresponding one of the second units.

13. A connection device for connecting a first device including plural first units to a second device including plural second units, wherein each of the plural first units is physically connected to one of the plural second units, the first device is connected to the second device, a connection unit is provided so that the first device is connected to the second device by a single connection unit, the plural first units output signals that are connected to the connection unit, the connection unit includes terminal blocks, wherein each of the terminal blocks corresponds to one of the first units, and each of the terminal blocks includes terminals corresponding to signals that are input to or output from the corresponding one of the first units, and the terminal blocks further include
a control signal terminal block corresponding to channel control signals, and
a transfer signal terminal block corresponding to signals other than the channel control signals.

14. A method performed by an image forming apparatus, the method comprising:

controlling, using a control device, plural image handling units, the plural image handing units being included in an image handling device;

connecting, using a connection unit, the image handling device to the control device so that the image handling device is connected to the control device by a single connection unit;

physically connecting each of the plural image handling units to the control device; and outputting signals, by the plural image handling units, that are connected to the connection unit.

* * * * *